(12) United States Patent
Tamaki et al.

(10) Patent No.: US 7,319,684 B2
(45) Date of Patent: Jan. 15, 2008

(54) SYSTEM AND METHOD FOR WIRELESS COMMUNICATION USING A MANAGEMENT SERVER AND ACCESS POINTS

(75) Inventors: Tsuyoshi Tamaki, Hachioji (JP); Takashi Yano, Tokorozawa (JP); Takaki Uta, Kokubunji (JP); Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 10/449,100

(22) Filed: Jun. 2, 2003

(65) Prior Publication Data

US 2003/0236103 A1   Dec. 25, 2003

(30) Foreign Application Priority Data

Jun. 21, 2002   (JP)   ............................. P2002-180775

(51) Int. Cl.
*H04B 7/212* (2006.01)
*H04B 7/00* (2006.01)
*H04J 3/06* (2006.01)

(52) U.S. Cl. .................... 370/337; 370/338; 370/347; 370/350; 455/68; 455/502; 455/522

(58) Field of Classification Search ................ 370/328, 370/337, 338, 345–350; 455/41.2, 446, 447, 455/448, 63.1, 68, 502; 375/356
See application file for complete search history.

(56) References Cited

U.S. PATENT DOCUMENTS

| | | | | |
|---|---|---|---|---|
| 5,448,753 A | * | 9/1995 | Ahl et al. ................. | 455/422.1 |
| 6,081,718 A | * | 6/2000 | Ando et al. .................. | 455/447 |
| 6,546,254 B2 | * | 4/2003 | Fitzgerald .................... | 455/447 |
| 6,895,255 B1 | * | 5/2005 | Bridgelall ................. | 455/552.1 |
| 6,954,616 B2 | * | 10/2005 | Liang et al. ................ | 455/63.1 |
| 7,046,649 B2 | * | 5/2006 | Awater et al. ............... | 370/338 |
| 7,050,452 B2 | * | 5/2006 | Sugar et al. ................. | 370/465 |
| 7,092,732 B2 | * | 8/2006 | Tamaki et al. .............. | 455/522 |
| 2003/0202498 A1 | * | 10/2003 | de Heer et al. ............. | 370/338 |

\* cited by examiner

*Primary Examiner*—Duc M. Nguyen
(74) *Attorney, Agent, or Firm*—Reed Smith LLP; Stanley P. Fisher, Esq.; Juan Carlos A. Marquez, Esq.

(57) ABSTRACT

A system and method are provided for wireless communication. In one example, a wireless communication system that enhances total system throughput is provided. The system performs parallel data transmission from a plurality of access points to a plurality of user terminals. On terminals with power control function, their transmit power can be set to minimize interference. The wireless communication system comprises a management server which performs centralized management of time of access-point-to-terminal packet transmission, access points, and user terminals that perform data transmission, according to transmission time control information from the management server. Transmit queues for measuring downlink traffic and receive queues for measuring uplink traffic are provided on the access points or the management server. The system determines uplink and downlink periods from the transmit and receive queue lengths. The system also controls the access points and user terminals to transmit for the determined periods. Consequently, packet collision due to transmission from a terminal that interferes with neighboring terminals is eliminated. Thus, system throughput is enhanced.

19 Claims, 25 Drawing Sheets

SUBJECT 1 (PACKET COLLISION)

PACKET COLLISION AVOIDANCE METHOD WITH VIRTUAL CARRIER SENSE

SUBJECT (WITH VIRTUAL CARRIER SENSE)

INVENTION (DATA COMMUNICATION)

REPORT OF TX AND RX QUEUE LENGTH

MESSAGE TYPE:0x01 (MEASUMENT RESULTS) REPORT OF TX AND RX QUEUE LENGTH

TRANSMISSION CONTROL INFORMATION

MESSAGE TYPE:0x02 TRANSMISSION CONTROL INFORMATION

INVENTION (DATA COMMUNICATION)

NUMBER OF ACCESS POINTS / USER TERMINAL (N)
(NUMBER OF ACCESS POINTS = NUMBER OF USER TERMINALS)

THROUGHPUT = $\sum_{i=1}^{N}$ (PASSAGE TRAFFIC / DEMAND TRAFFIC)

RATIO OF UPLINK TRAFFIC (R) =
$(\sum_{i=1}^{N}$ UPLINK DEMAND TRAFFIC$)/$
$(\sum_{i=1}^{N}$ (TOTAL) DEMAND TRAFFIC$)$

INVENTION (AUTONOMOUS DISTRIBUTED TYPE:
EXTENDED VIRTUAL CARRIER SENSE)

CTS' FORMAT

SYSTEM AND METHOD FOR WIRELESS COMMUNICATION USING A MANAGEMENT SERVER AND ACCESS POINTS

BACKGROUND OF THE INVENTION

1. Field of the Invention

The present invention generally relates to a wireless access method and a transmission method in a wireless communication system and, more particularly, to a communication system that enables communication between a user terminal and a network access point without interference.

2. Discussion of Background

In previous wireless access systems, as typified by a wireless LAN, a user terminal connects to an access point of a wired network so that it can get Internet services.

FIG. 1 shows a system configuration example of a wireless access system. User terminals 108a, 108b, 108c can connect to a provider network 105 through their access points 107a, 107b, 107c and via an IP router 106. Because the provider network 105 connects to the Internet 103 through a gateway equipment 104, the user terminals 108a, 108b, 108c can access a Web server 102 of a content provider 101 on the Internet 103 and download content. The access points 107a, 107b, 107c are wired to the IP router 106 by Asymmetric Digital Subscriber Lines (ADSLs) or optical fibers.

In such a wireless access system, users often buy and set up their access points and, in most cases, they do so without considerations that communication interference may occur when multiple access points use a same communication channel.

FIG. 2 is a schematic diagram that explains an access method addressing the interference problem between access points, specified in Media Access Control (MAC) sublayer specifications of the IEEE 802.11 standard for wireless LAN specifications.

A communication access method for performing data communication by random access is used, wherein a Carrier Sense Multiple Access/Collision Avoidance (CSMA/CA) approach is performed which avoids collision by carrier sense so that data packets from communication nodes do not collide. A transmitting node transmits data packets after judging whether the communication channel over which to transmit data is idle by carrier sense. The carrier sense method is such that a node transmits random pulses within a given period (collision avoidance window) before transmitting data packets. When a node is not transmitting pulses, it monitors the transmission channel and transmits data packets unless pulses other than those transmitted from the node are detected. When the node detects the pulses other than those transmitted from it, it stops the transmission of data packets, waits for a given period which is randomly selected, and performs carrier sense again.

As shown in FIG. 2, while an access point 107b is transmitting data packets to a user terminal 108b, another access point 107c knows that another node is now communicating with a terminal by carrier sense. Then, the access point 107b waits for a given period and performs carrier sense again, and, after making sure that the transmission channel has become idle, transmits data packets. In this way, arrangement is provided so that data is transmitted in a time sharing manner, thus avoiding communication interference between access points.

The carrier sense method applied in the previous wireless access system avoids interference by sharing time for communication, as described above. However, a problem of this method is that data quantity that can be transmitted per unit time does not increase and, therefore, even if the number of access points increases, the total system throughput does not increase and, on the contrary, throughput per access point decreases.

FIG. 3 is a schematic diagram that explains a method for enhancing throughput by parallel transmission from access points. While another access point exists within the range of interference of one access point in FIG. 2, interference can be avoided by putting another access point out of the range of interference of one access point. Specifically, by attenuating the transmitting power of an access point and setting its transmit/receive antenna directed toward a target user terminal, radio waves from the access point does not arrive at its neighboring access point. Thus, as shown in FIG. 3, while an access point 107a is transmitting data packets to a user terminal 108a, another access point 107b can transmit data packets to another user terminal 108b. If each access point has an independent transmission channel to a user terminal, transmission capacity increases and the total system throughput increases. However, equipping a user terminal with a directional antenna and a power control function is costly because of high functionality. Therefore, such a system exists in which access points are equipped with a directional antenna and/or a power control function and user terminals are equipped with a non-directional antenna and without the power control function, and uplink transmit/receive power and downlink transmit/receive power are asymmetric. This system is, in short, such that access points can communicate with a user terminal of choice, but user terminals do not have such selectivity. As functionality of access points, for example, an access point is provided with a function to restrict the range of arrival of radio waves it transmits. As a typical example, a directional antenna, a transmission power control function, or combination thereof may be available. It is sufficient for user terminals to have a normal transmission function (non-directional antenna).

In theory, the access point function and the user terminal function are interchangeable. However, in practice equipping a user terminal with a directional antenna is quite difficult from a technical perspective.

FIG. 4 is a schematic diagram that shows a problem associated with a wireless communication system where access points are equipped with a directional antenna and power control function, where user terminals are equipped with a non-directional antenna and without the power control function. When an access point 107a is transmitting data packets to a user terminal 108a, another user terminal 108b cannot detect radio waves from the access point 107a even when it performs carrier sense and, therefore, transmits data packets to its correspondent access point 107b. At this time, at the user terminal 108a, a data packet transmitted from the access point 107a collides with a data packet transmitted from the user terminal 108b. Accordingly, a Carrier to Interference Ratio (CIR) required for decoding cannot be satisfied. Consequently, the data packets are lost. Because of no Ack reply to the transmitted data packet, the access point 107a retransmits a data packet. Such loss of packets is known as a hidden terminal problem. As countermeasures against this problem, a method for avoiding packet collision by virtual carrier sense has been proposed.

FIG. 5 is schematic diagram that shows the method for avoiding packet collision by virtual carrier sense. Immediately before transmitting data to a user terminal 108a, an access point 107a transmits a data packet called Request to Send (RTS) in which scheduled time during which it will use the transmission channel is specified. Upon having received the RTS control packet, the user terminal 108a transmits a control packet called Clear to Send (CTS) in which the scheduled time during which the transmission channel will be used is specified. When another user terminal 108b receives the CTS control packet, transmission from the user terminal 108b is prohibited for the scheduled time during which the access point 107a uses the transmission channel and data packet collision is avoided. By this method, data transmission is performed in a time sharing manner, as is the case for the carrier sense method shown in FIG. 2. Consequently, packet collision can be avoided. Unfortunately, the problem that the total system throughput does not increase even if the number of access points increases is not solved.

FIG. 6 is a schematic diagram that shows the reason why throughput does not increase even with virtual carrier sense. In the system where access points are equipped with a directional antenna and power control function, where user terminals are equipped with a non-directional antenna and without the power control function, and uplink transmit/receive power and downlink transmit/receive power are asymmetric, assume that concurrent transmission of downlink traffic from the access points to the user terminals is performed.

First, virtual carrier sense is performed by exchanging RTS and CTS control packets between an access point 107a and a user terminal 108 in order that the access point 107a transmits data to the user terminal 108a. Upon the reception of the CTS control packet from the user terminal 108a, another user terminal 108b is set in a transmit prohibition state. Then, another access point 107b transmits an RTS control packet to the user terminal 108b for data transmission thereto. The user terminal 108b receives the RTS control packet, but cannot transmit back a CTS control packet because of its transmit prohibition state. The access point 107b retries the RTS packet transmission until it receives a CTS control packet from the user terminal 108b or up to the predetermined maximum number of times of RTS retransmission. Because the communication between the access point 107b and the user terminal 108b is enabled just after the user terminal 108b is released from the transmit prohibition state, the access point 107a and the access point 107b cannot perform transmission concurrently because of the RTS and CTS control.

SUMMARY OF THE INVENTION

The present invention fills the aforementioned needs by providing a communication system comprising a plurality of user terminals and a plurality of access points, the access points being configured to enable transmission to a target user terminal without interfering with other access points or user terminals. It should be appreciated that the present invention can be implemented in numerous ways, including as a process, an apparatus, a system, a device or a method. Several inventive embodiments of the present invention are described below.

In one embodiment, a wireless communication system that enhances total system throughput is provided. The system performs parallel data transmission from a plurality of access points to a plurality of user terminals. On terminals with power control function, their transmit power can be set to minimize interference. The wireless communication system comprises a management server which performs centralized management of time of access-point-to-terminal packet transmission and access points and user terminals which perform data transmission, according to transmission time control information from the management server. Transmit queues for measuring downlink traffic and receive queues for measuring uplink traffic are provided on the access points.

In another embodiment, transmit queues for measuring downlink traffic and receive queues for measuring uplink traffic are provided in the management server.

Generally, the wireless communication system determines uplink and downlink periods from the transmit and receive queue lengths. The system also controls the access points and user terminals to transmit for the determined periods. Consequently, packet collision due to transmission from a terminal that interferes with neighboring terminals is eliminated. Thus, system throughput is enhanced.

The invention encompasses other embodiments of a method, a system, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention for a system and method for wireless communication is disclosed. Numerous specific details are set forth in order to provide a thorough understanding of the present invention. It will be understood, however, to one skilled in the art, that the present invention may be practiced without some or all of these specific details.

Figure 7:
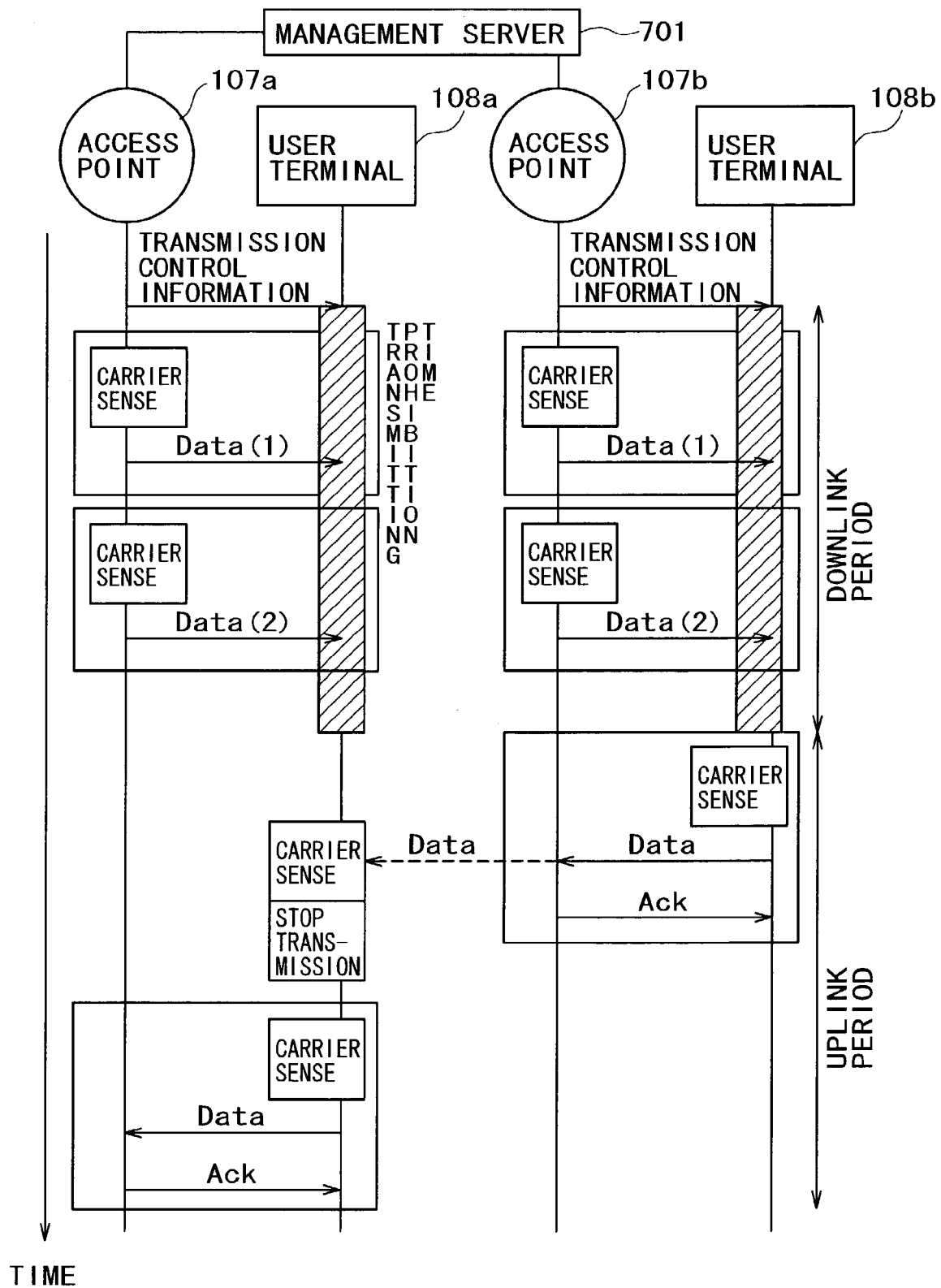
FIG. 7 is a schematic diagram that explains a traffic control method of centralized management type, in accordance with a first embodiment of the present invention.

FIG. 7 is a schematic diagram that explains a traffic control method of centralized management type, in accordance with a first embodiment of the present invention. A management server 701 performs traffic control in a centralized management manner by getting information for traffic between access points 107a, 107b and user terminals 108a, 108b under its management, calculating the time of data packet transmission from an access point to a user terminal (downlink period) and the time of data packet transmission from a user terminal to an access point (uplink period), and sending transmission control information to the access points and user terminals. This traffic control enables the access points 107a and 107b to transmit data packets to the user terminals 108a and 108b simultaneously. Thus, the total system throughput can be enhanced.

In the MAC layer protocol, however, one acknowledgement (Ack) packet to one packet received is sent back to the sending side. Accordingly, when one data packet is transmitted from an access point 107b to a user terminal 108b during a downlink period, one Ack packet is sent back from the user terminal 108b to the access point 107b. In consequence, at a user terminal 108a, there is a possibility that a data packet transmitted from an access point 107a collides with the Ack packet transmitted from the user terminal 108b.

Figure 8:
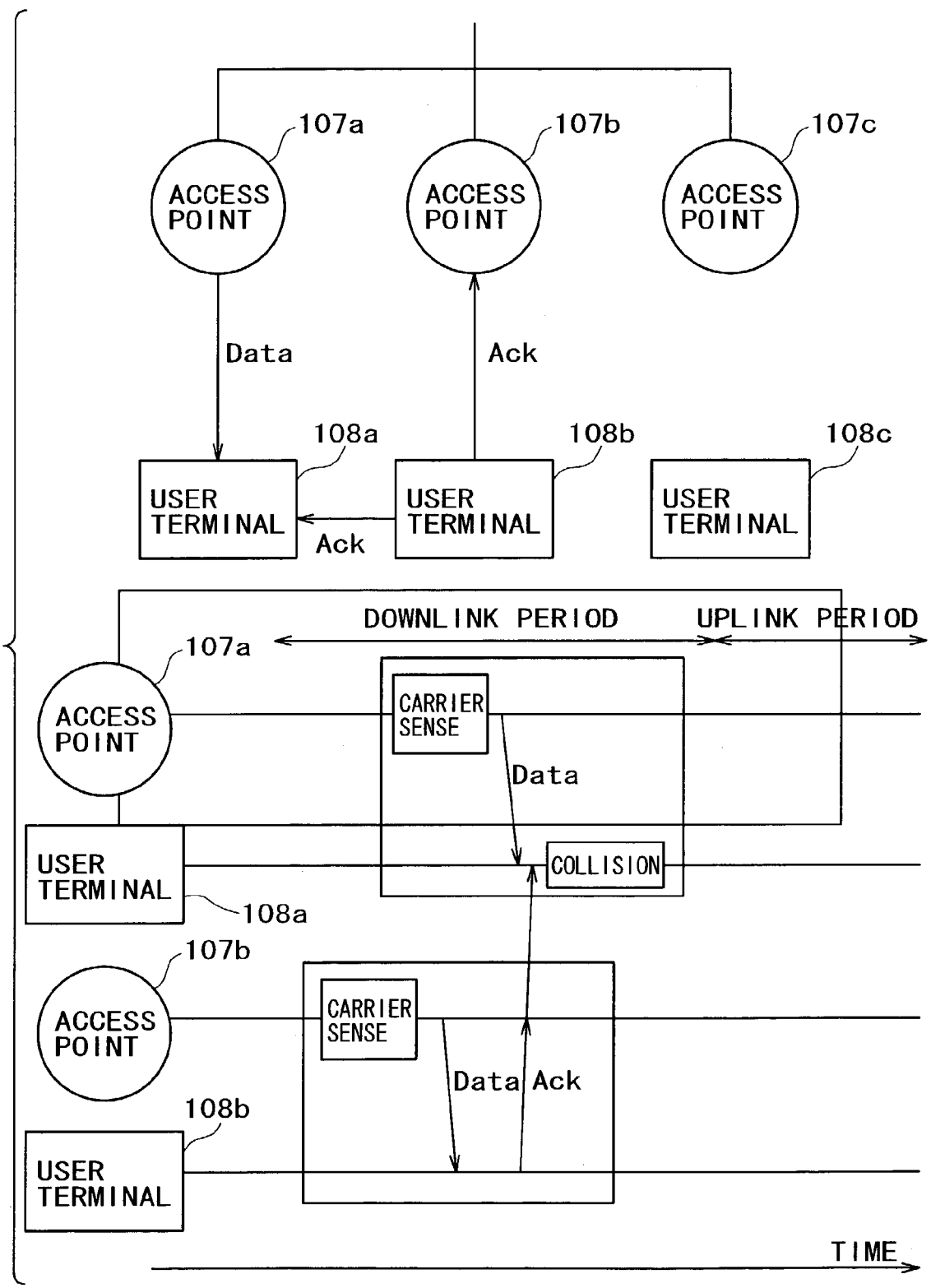
FIG. 8 is a schematic diagram regarding an Ack packet and data packet collision problem, in accordance with a first embodiment of the present invention.

FIG. 8 is a schematic diagram regarding an Ack packet and data packet collision problem, in accordance with a first embodiment of the present invention. FIG. 8 shows a collision event that a data packet transmitted from the access point 107a to the user terminal 108a collides with an Ack packet transmitted from the user terminal 108b to the access point 107b during a downlink period. To overcome this problem, the following two ways of control can be taken: synchronizing Ack packet transmission timing if Ack transmission during a downlink period is permitted; and allowing Ack packets to transmit during an uplink period only without permitting Ack transmission during a downlink period.

Figure 9:
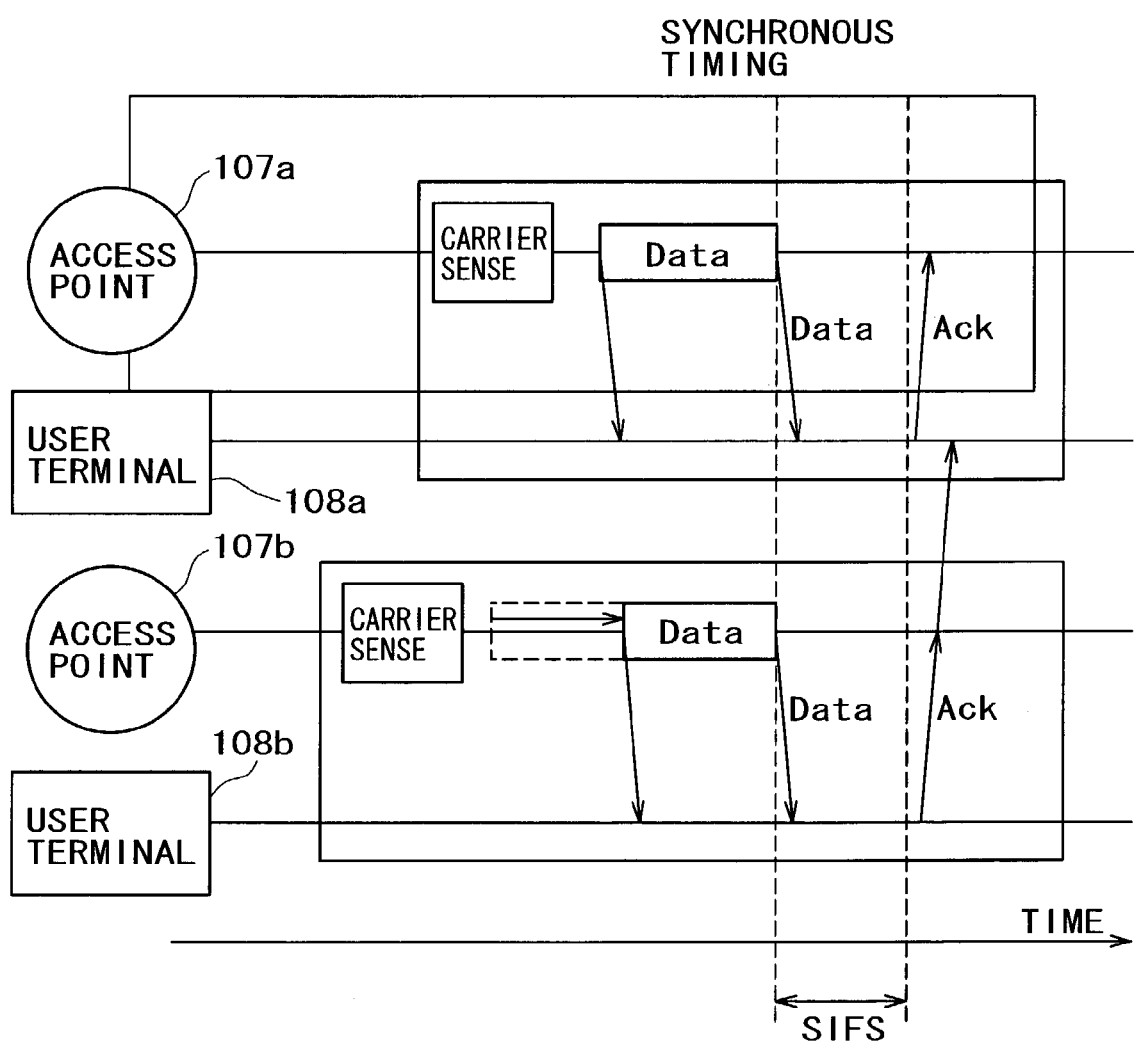
FIG. 9 is a schematic diagram that explains a method of synchronizing Ack packet transmissions during a downlink period, in accordance with a first embodiment of the present invention.

FIG. 9 is a schematic diagram that explains a method of synchronizing Ack packet transmissions during a downlink period, in accordance with a first embodiment of the present invention. Time of transmission is adjusted so that the end of data packet transmission from the access point 107a to the user terminal 108a is synchronized with the end of data packet transmission from the access point 107b to the user terminal 108b. The user terminals 108a and 108b transmit Ack packets upon the elapse of a given period Short Inter-Frame Space (SIFS) after they receive data packets and, consequently, the Ack packet transmission timing is adjusted to the same time. Because the Ack packets are respectively received by the directional antennas at the access points 107a and 107b, the Ack packet transmitted from the user terminal 108a does not arrive at the access point 107b and the Ack packet transmitted from the user terminal 108b does not arrive at the access point 107a, even if the Ack packets are transmitted at the same time. Thus, no problem occurs even if the Ack packets are transmitted at the same time.

Figure 10:
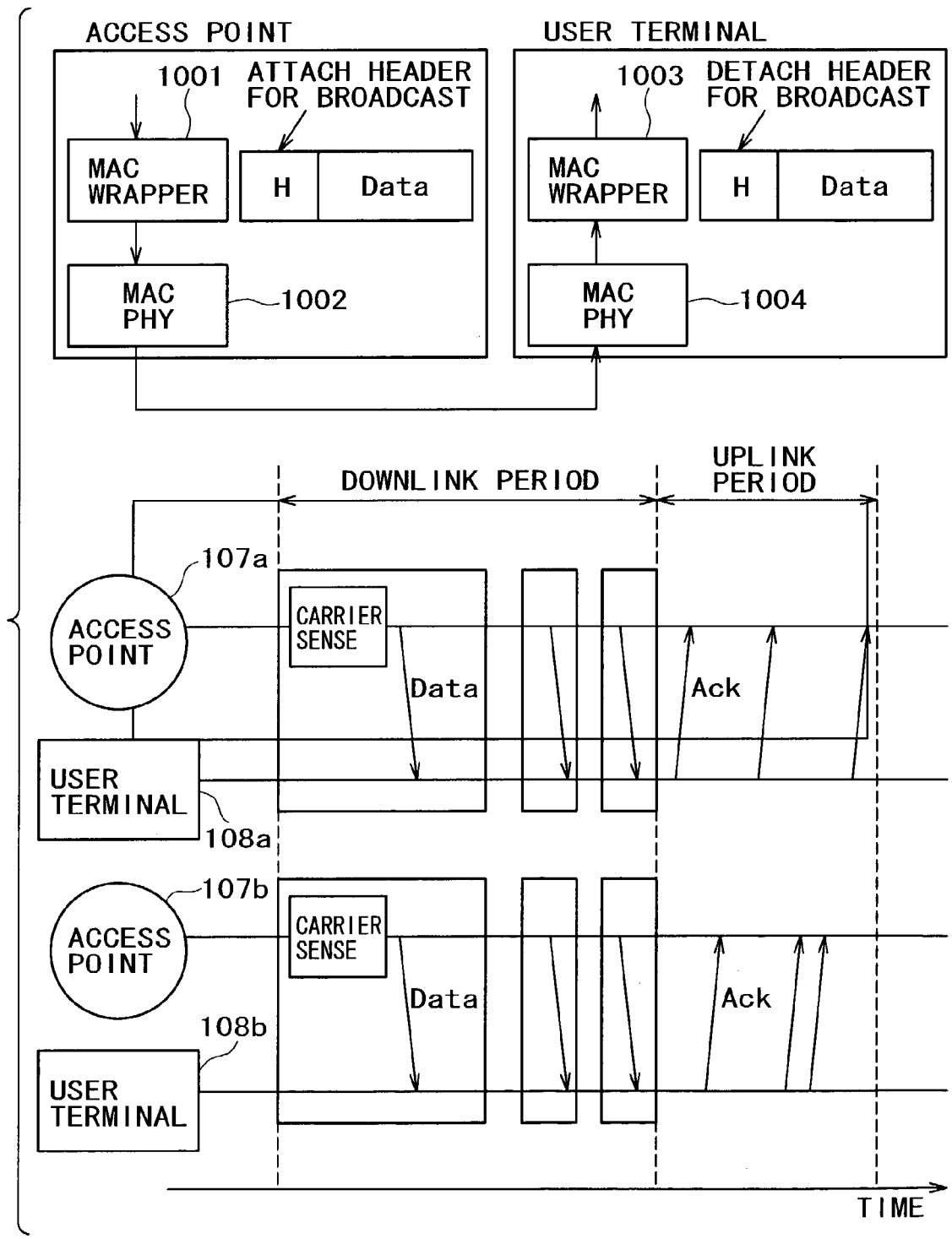
FIG. 10 is a schematic diagram that shows a control method for allowing Ack packets to transmit during uplink periods, in accordance with a first embodiment of the present invention.

FIG. 10 is a schematic diagram that shows a control method for allowing Ack packets to transmit during uplink periods, in accordance with a first embodiment of the present invention. A MAC wrapper 1001 in an access point attaches a broadcast header conveying destination information to a broadcast packet and maps data in the packet and the access point transmits this data packet so that Ack packet transmission from the user terminals 108a and 108b does not occur during a downlink time. A MAC wrapper 1003 of a user terminal reads the broadcast packet header, makes sure that the packet is addressed to the user terminal, and detaches the broadcast header. Consequently, Ack packets are not transmitted from the user terminals 108a and 108b during a downlink period. The MAC wrapper 1003 of a user terminal transmits an Ack packet to its correspondent access point during an uplink period, thus preventing the error correction ability from degrading.

Figure 11:
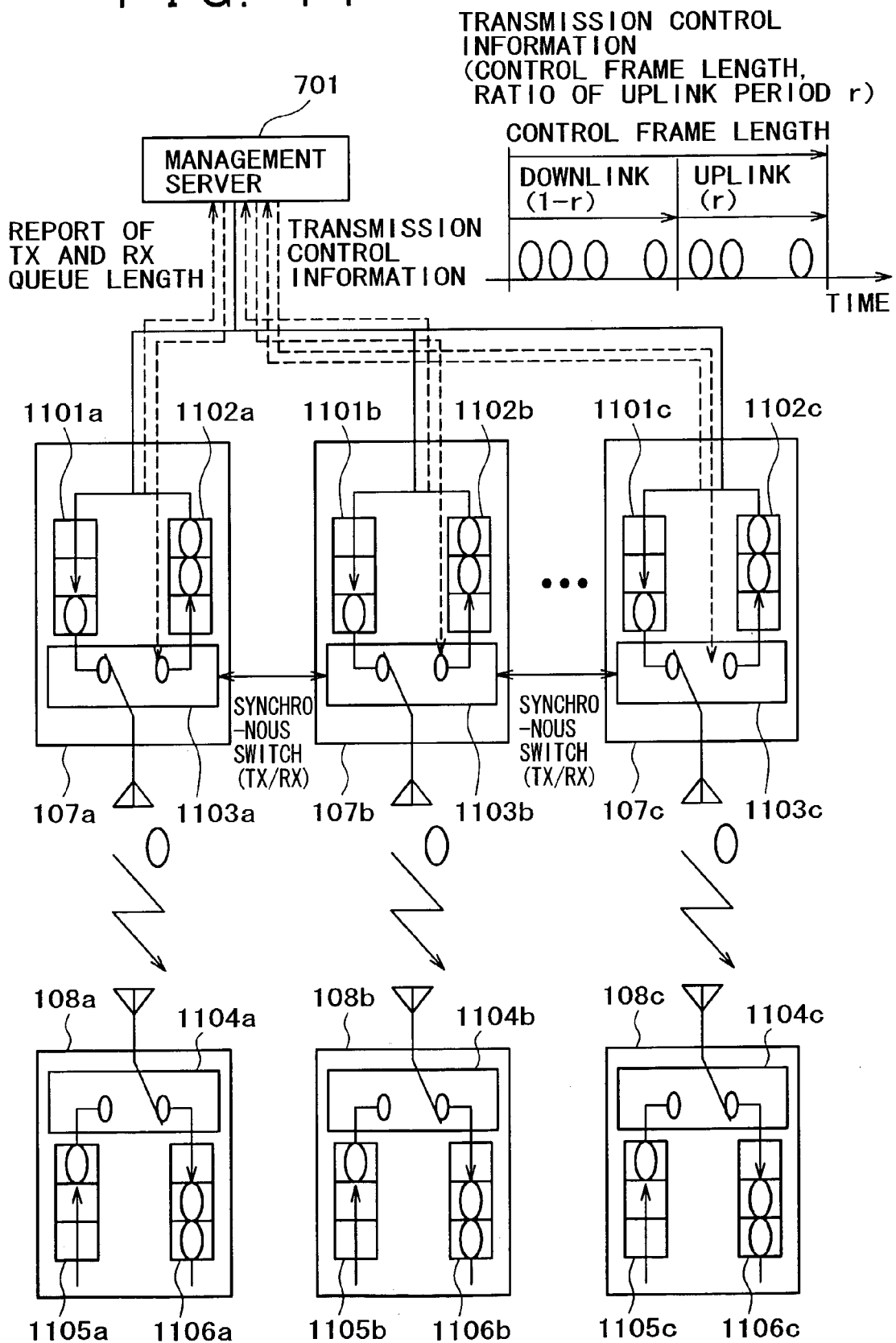
FIG. 11 is a configuration diagram of a traffic control system of centralized management type, in accordance with a first embodiment of the present invention.

FIG. 11 is a configuration diagram of a traffic control system of centralized management type, in accordance with a first embodiment of the present invention. The access points 107a, 107b, 107c have transmit (TX) queues 1101a, 1101b, 1101c for storing data packets to transmit and receive (RX) queues 1102a, 1102b, 1102c for storing data packets received, respectively, and report the lengths of the TX and RX queues to the management server 701. The management server determines downlink traffic size from the TX queue length and uplink traffic size from the RX queue length. Based on the downlink and uplink traffic size, the management server calculates a downlink period and an uplink period and feeds back the control frame length (the sum of the downlink period and the uplink period) and the ratio of the uplink period in the control frame length (the ratio of uplink period) to the access points 107a, 107b, 107c.

Given that i stands for an access point, TXL_i for TX queue length, and RXL_i for RX queue length, control frame length FL and a ratio of uplink period r in the control frame length are obtained by the following equations (1) and (2):

$$FL = \max(TXL\_i) + \Sigma RXL\_i \quad (1)$$

$$R = \Sigma RXL\_i / FL \quad (2)$$

When the access points 107a, 107b, 107c receive information, the control frame length and the ratio of uplink period, they perform synchronous switching control of transmit/receive timing, using TX and RX timing controls 1103a, 1103b, 1103c, respectively, so that concurrent transmission of downlink traffic can be performed. The user terminals 108a, 108b, 108c also perform synchronous switching control of transmit/receive timing, using TX and RX timing controls 1104a, 1104b, 1104c, respectively, in synchronous with the corresponding timing at the access points, so that uplink traffic data transmission is performed.

Figure 12:
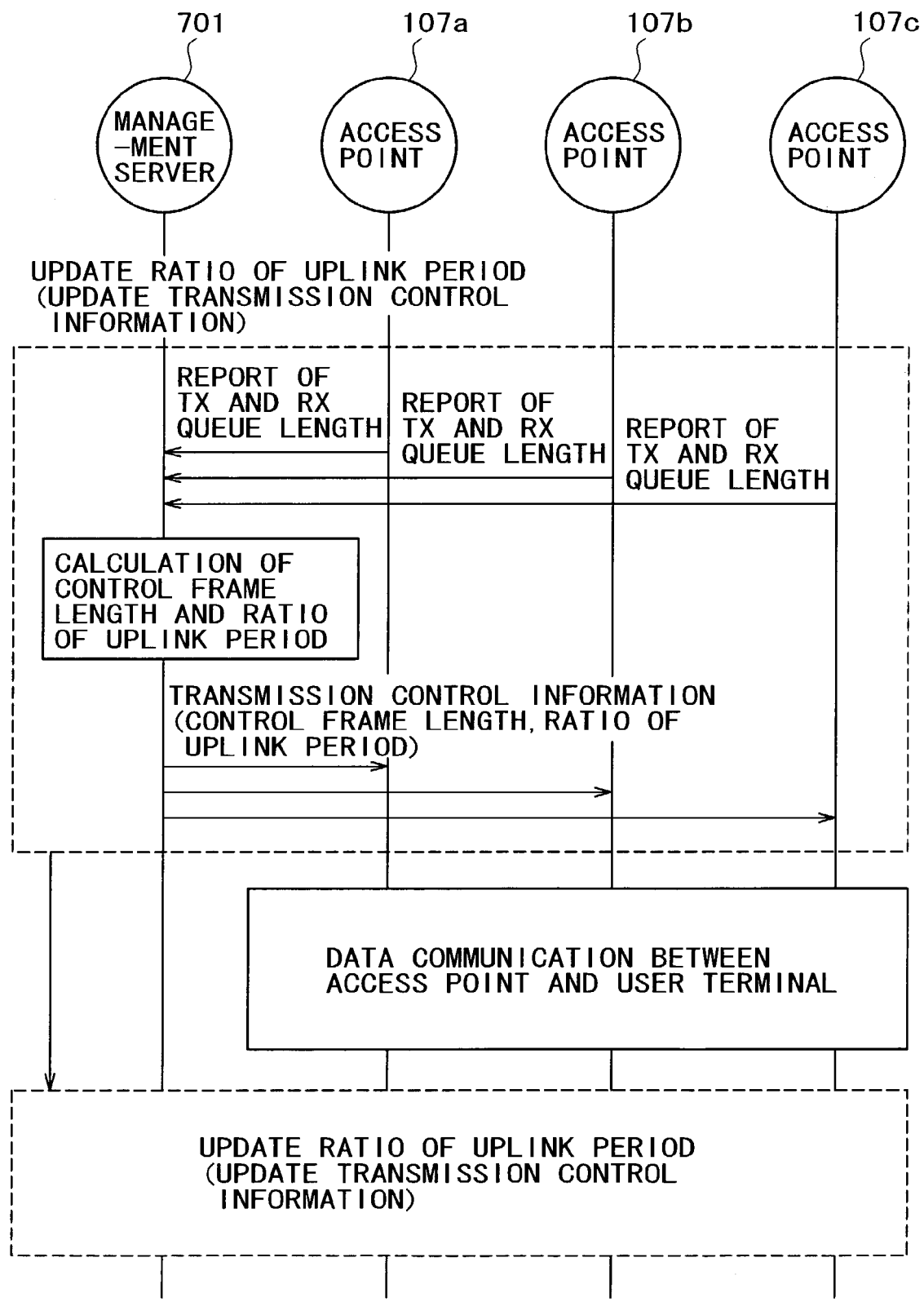
FIG. 12 is a sequence diagram of centralized management type control, in accordance with a first embodiment of the present invention.

FIG. 12 is a sequence diagram of centralized management type control, in accordance with a first embodiment of the present invention. The access points 107a, 107b, 107c periodically send control packet for reporting measured TX and RX queue lengths to the management server 701. The management server 701 calculates the above-mentioned control frame length and ratio of uplink period and transmit control packets of transmission control information to the access points. Based on the transmission control information, data communication is performed between the access points and user terminals, which is separated into a downlink period and a uplink period, as shown in FIG. 7. While an example that transmission control information is transmitted per TX and RX queue length report is illustrated in FIG. 12, transmission control information may be transmitted once for several times of TX and RX queue length report.

Figure 13A:
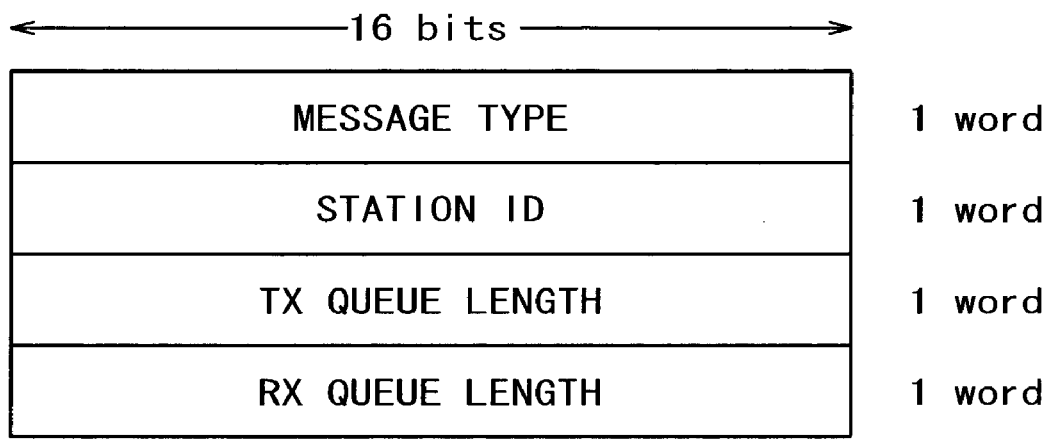
FIG. 13A is a diagram illustrating respective control message formats of a TX and RX queue length report, in accordance with a first embodiment of the present invention.

FIG. 13A is a diagram illustrating respective control message formats of a TX and RX queue length report, in accordance with a first embodiment of the present invention. The TX and RX queue length report contains the following elements: message type, station ID, TX queue length, and RX queue length.

Figure 13B:
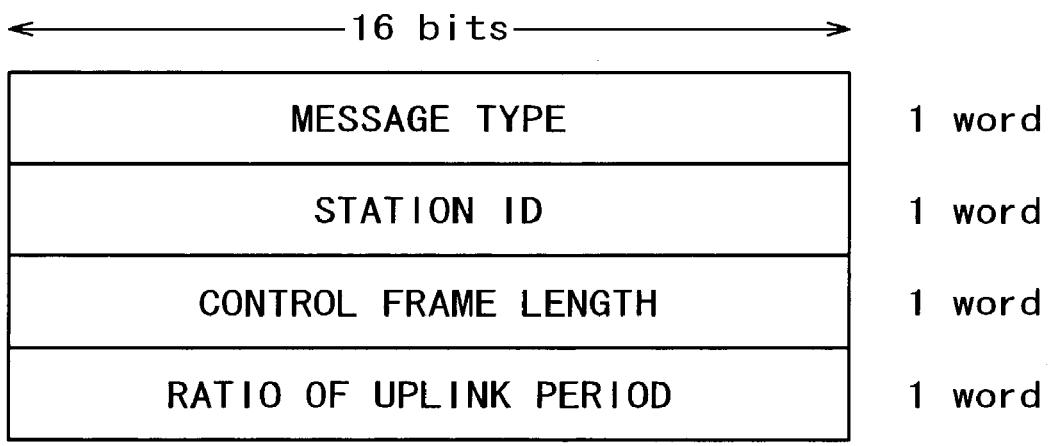
FIG. 13B is a diagram illustrating respective control message formats of transmission control information, in accordance with a first embodiment of the present invention.

FIG. 13B is a diagram illustrating respective control message formats of transmission control information, in accordance with a first embodiment of the present invention. The transmission control information contains the following elements: message type, station ID, control frame length, and ratio of uplink period.

Figure 14:
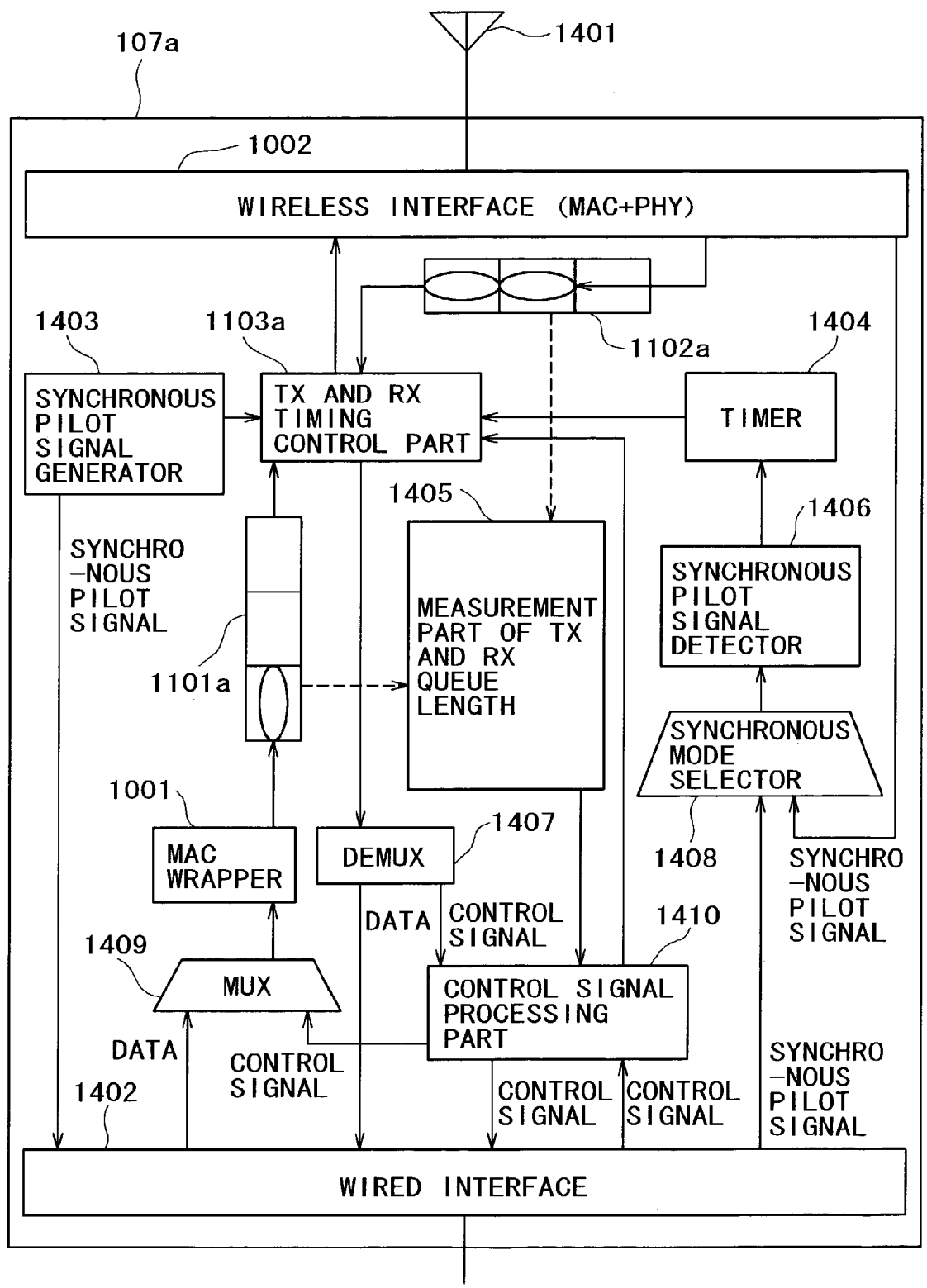
FIG. 14 is a configuration diagram of an access point, in accordance with a first embodiment of the present invention.

FIG. 14 is a configuration diagram of an access point, in accordance with a first embodiment of the present invention. An access point is comprised of a directional antenna 1401 for transmitting and receiving wireless signals; a wireless interface 1002 which performs wireless signal processing; a wired interface 1402 which performs wired signal processing; an RX queue 1102a to store data packets from the wireless interface 1002 to the wired interface 1402; a TX queue 1101a to store data packets from the wired interface 1402 to the wireless interface 1002; a measurement part of TX and RX queue length 1405 to measure variable TX and RX queue lengths; a control signal processing part 1410 which creates control signals for notifying the management server 701 of measurement results from the measurement part of TX and RX queue length 1405 and which receives control signals about time of data packet transmission from the management server 701; a multiplexer (MUX) 1409 which multiplexes data packets from the wired interface 1402 and control signal packets from the control signal processing part 1410; a MA wrapper 1001 which maps multiplexed signals from the MUX 1409 into a broadcast packet; a demultiplexer (DEMUX) 1407 which demultiplexes received packets from the wireless interface 1002 into data packets to the wired interface 1402 and control signal packets to the control signal processing part 1410; a TX and RX timing control part 1103a which controls the timing of writing from the TX queue 1101a to the wireless interface 1002 and the timing of writing from the RX queue 1102a to the wired interface 1402, based on information from the control signal processing part 1410; a timer 1404 which provides time information for managing TX and RX timing, a synchronous pilot signal generator 1403 which generates signals for synchronizing another access point with time information from the timer; a synchronous mode selector 1408 which selects either the wireless interface 1002 or the wired interface 1402 from which synchronous pilot signals-are supplied; and a synchronous pilot signal detector 1406 which detects selected synchronous pilot signals.

Figure 15:
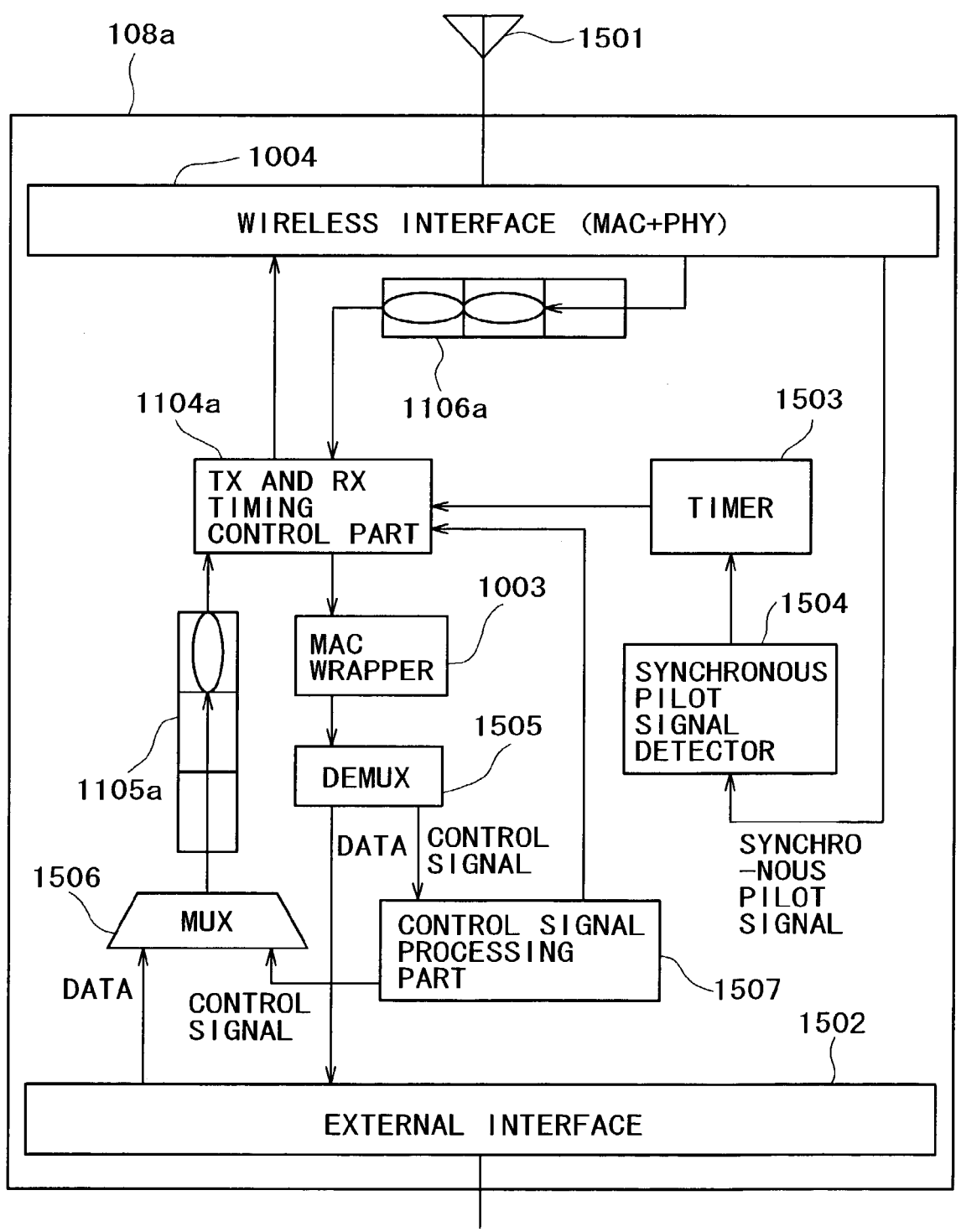
FIG. 15 is a configuration diagram of a user terminal, in accordance with a first embodiment of the present invention.

FIG. 15 is a configuration diagram of a user terminal, in accordance with a first embodiment of the present invention. A user terminal is comprised of an antenna 1501 for transmitting and receiving wireless signals; a wireless interface 1004 which performs wireless signal processing; an external interface 1502 which performs signal processing for interfacing with an external device such as a speaker; an RX queue 1106a to store data packets from the wireless interface 1004 to the external interface 1502; a TX queue 1105a to store data packets from the external interface 1502 to the wireless interface 1004; a control signal processing part 1507 which receives control signals about time of data packet transmission from an access point; a MUX 1506 which multiplexes data packets from the external interface 1502 and data packets from the wireless interface 1004; a MAC wrapper 1003 which reads broadcast packet headers attached to received packets from the wireless interface 1004 and detaches the headers a DEMUX 1505 which demultiplexes signals processed by the MAC wrapper 1003 into data packets to the external interface 1502 and control signal packets to the control signal processing part 1507; a TX and RX timing control part 1104a which controls the timing of writing from the TX queue 1105a to the wireless interface 1004 and the timing of writing from the RX queue 1106a to the external interface 1502, based on information from the control signal processing part 1507; a timer 1503 which provides time information for managing TX and RX timing; and a synchronous pilot signal detector 1504 which detects synchronous pilot signals for synchronizing with an access point from the wireless interface 1004 and rectifies the timer 1503.

Figure 16:
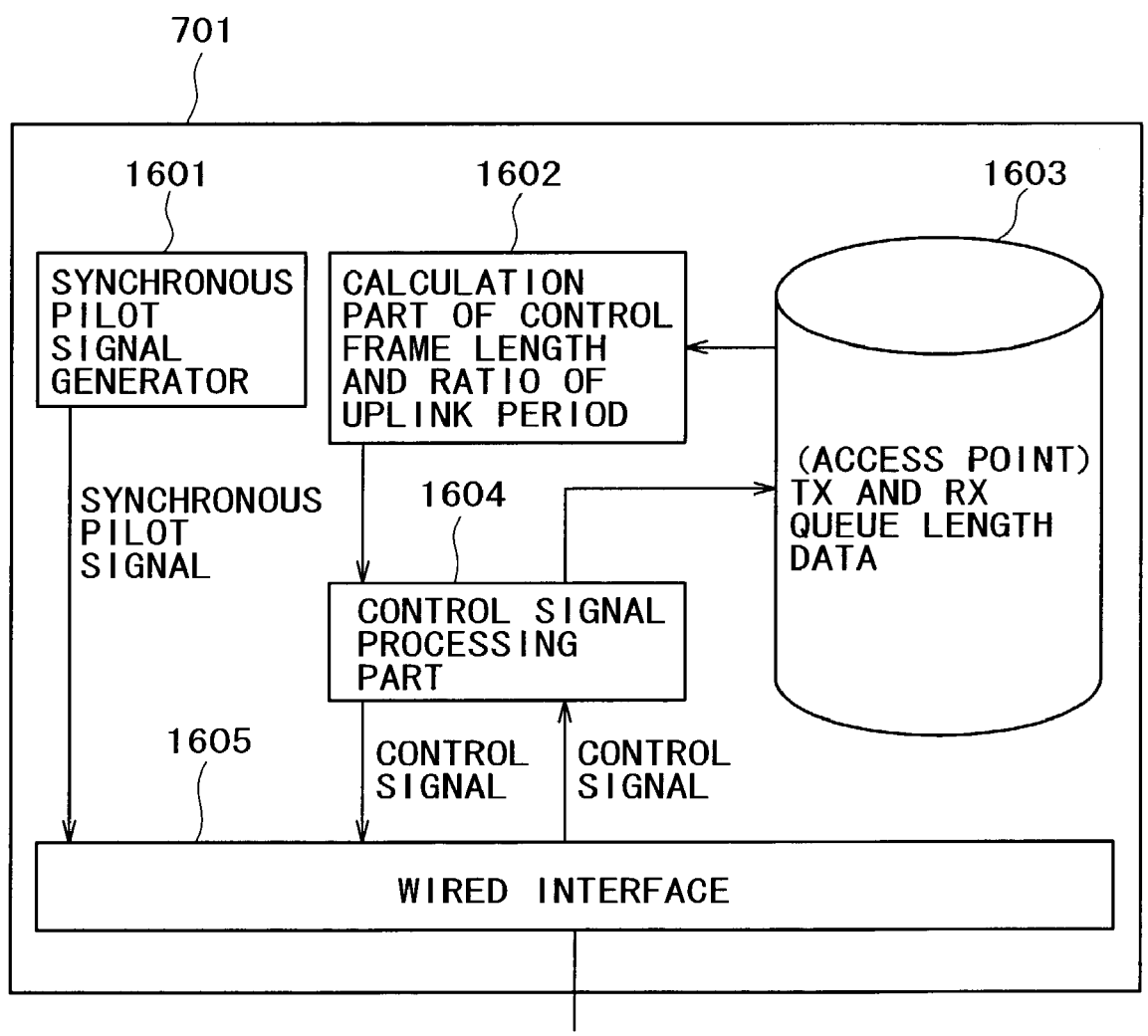
FIG. 16 is a configuration diagram of the management server, in accordance with a first embodiment of the present invention.

FIG. 16 is a configuration diagram of the management server, in accordance with a first embodiment of the present invention. The management server is comprised of a wired interface 1605 which performs wired signal processing; a database for access point TX and RX queue length data 1603 to register the measurements of TX and RX queue lengths obtained from the access points; a calculation part of control frame length and a ratio of uplink period 1602 which calculates the length of a control frame in which time of data packet transmission between an access point and a user terminal is controlled and a ratio of time of data packet transmission on the uplink in the control frame (a ratio of uplink period), based on the access point TX and RX queue length data 1603; a control signal processing part 1604 which generates control signals from the management server to the access points and interprets received control signals; and a synchronous pilot signal generator 1601 which generates pilot signals for synchronizing a plurality of access points.

Figure 17:
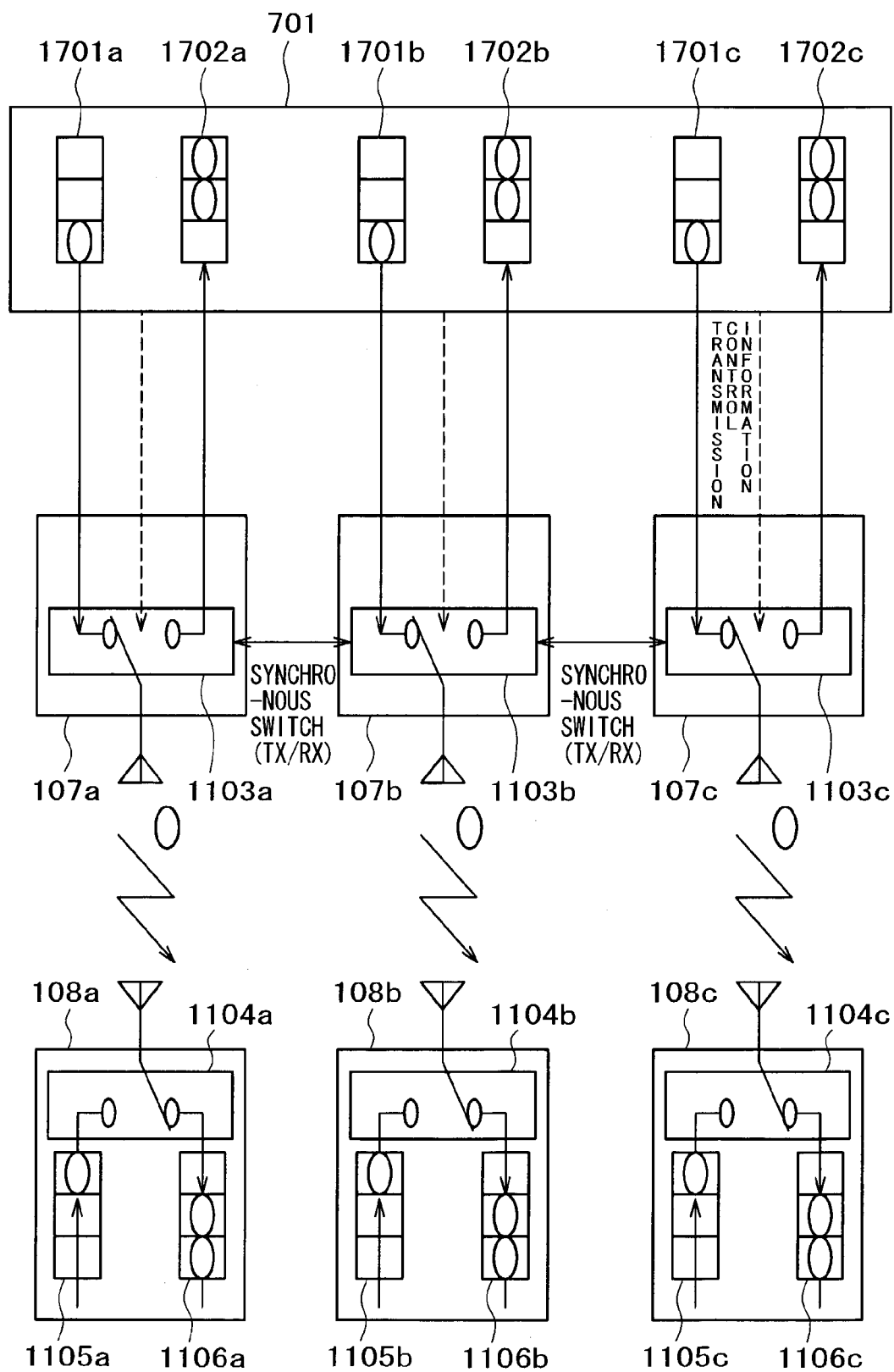
FIG. 17 is an schematic diagram that shows a traffic control method of centralized management type, in accordance with a second of the present invention.

FIG. 17 is an schematic diagram that shows a traffic control method of centralized management type, in accordance with a second of the present invention. The management server 701 monitors all data packets passing through the access points. By this monitoring, the management server 701 can determine traffic size from changes in its TX queues 1701a, 1701b, 1701c for packets transmitted to the access points 107a, 107b, 107c, and its RX queues 1702a, 1702b, 1702c for packets received from the access points 107a, 107b, 107c. The management server can control downlink periods and uplink periods by calculating a ratio of uplink period to downlink period and sending transmission control information to the access points 107a, 107b, 107c. As compared with the embodiment illustrated in FIG. 11, the management server 701 should be provided with higher functionality, as the management server 701 must perform data processing of all data packets. However, control signal overhead is less, as the management server 701 need not receive control signals from the access points.

The configuration of a user terminal in the first embodiment of the present invention is substantially the same as that shown in the second embodiment. The configuration of an access point in the second embodiment is similar to that shown in the first embodiment. The access point in the second embodiment may be like that from the first embodiment, but differ in that the functions of the TX queue, RX queue, and measurement part of TX and RX queue length may be removed. Alternatively, the access point in the second embodiment may be substantially same as that from the first embodiment.

Figure 18:
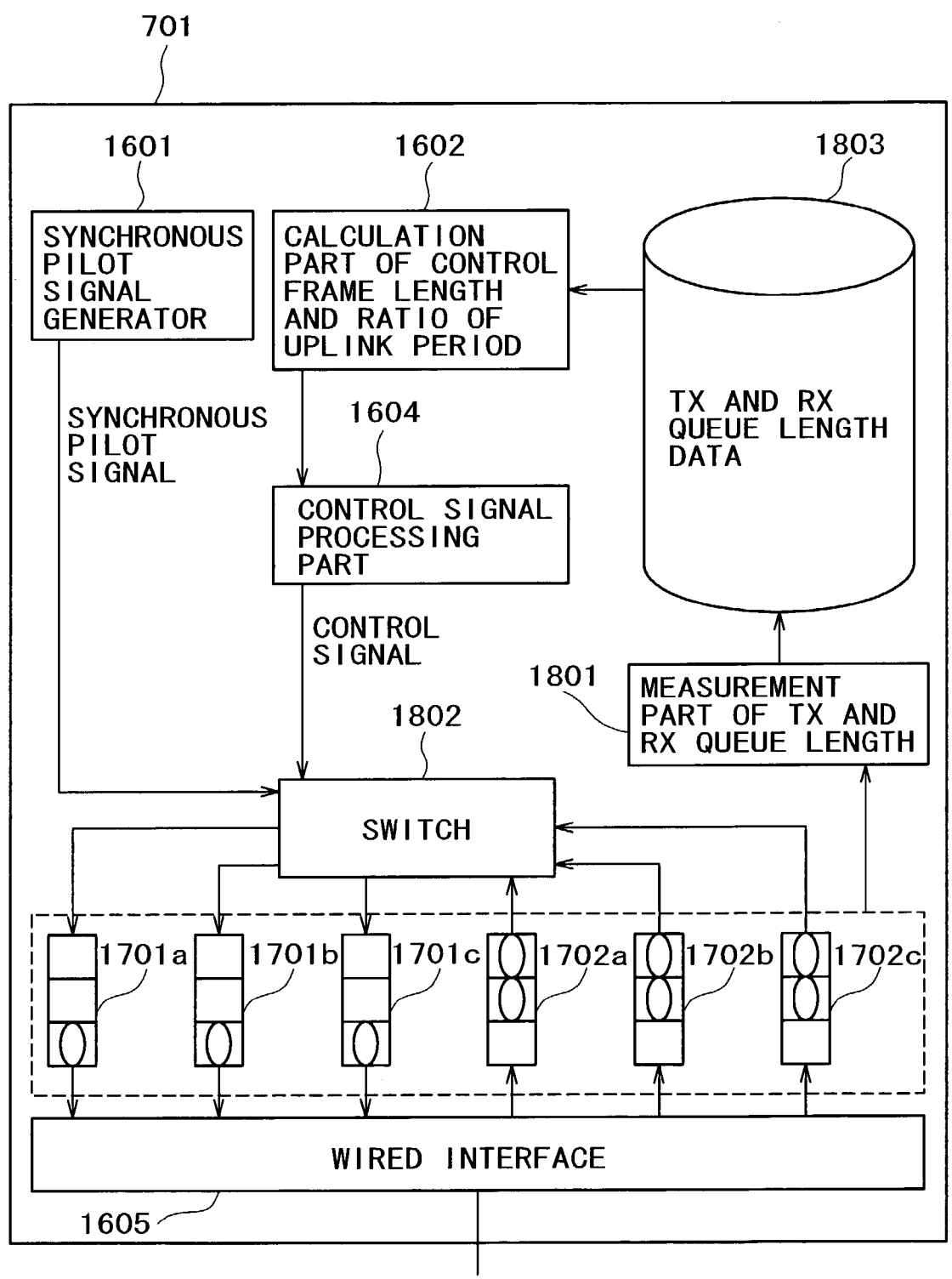
FIG. 18 shows a configuration diagram of the management server, in accordance with a second embodiment of the present invention.

FIG. 18 shows a configuration diagram of the management server, in accordance with a second embodiment of the present invention. The management server is comprised of a wired interface 1605 which performs wired signal processing; TX queues 1701a, 1701b, 1701c to store data packets from the management server to the access points; RX queues 1702a, 1702b, 1702c to store data packets from the access points to the management server; a measurement part of TX and RX queue length 1801 to measure TX and RX queue lengths; a database for TX and RX queue length data 1803 to register the measurement results from the measurement part of TX and RX queue length 1801; a calculation part of control frame length and a ratio of uplink period 1602 which calculates, one, the length of a control frame in which time of data packet transmission between an access point and a user terminal is controlled and, two, a ratio of time of data packet transmission on the uplink in the control frame (a ratio of uplink period), based on the TX and RX queue length data 1803; a control signal processing part 1604 which generates control signals from the management server to the access points and interprets control signals; a synchronous pilot signal generator 1601 which generates pilot signals for synchronizing a plurality of access points; and a switch 1802 which performs routing and setting forwarded-to-destinations of control signals from the control signal processing part 1604, synchronous pilot signals from the synchronous pilot signal generator 1601, and data packets from the RX queues 1702a, 1702b, 1702c.

Figure 19:
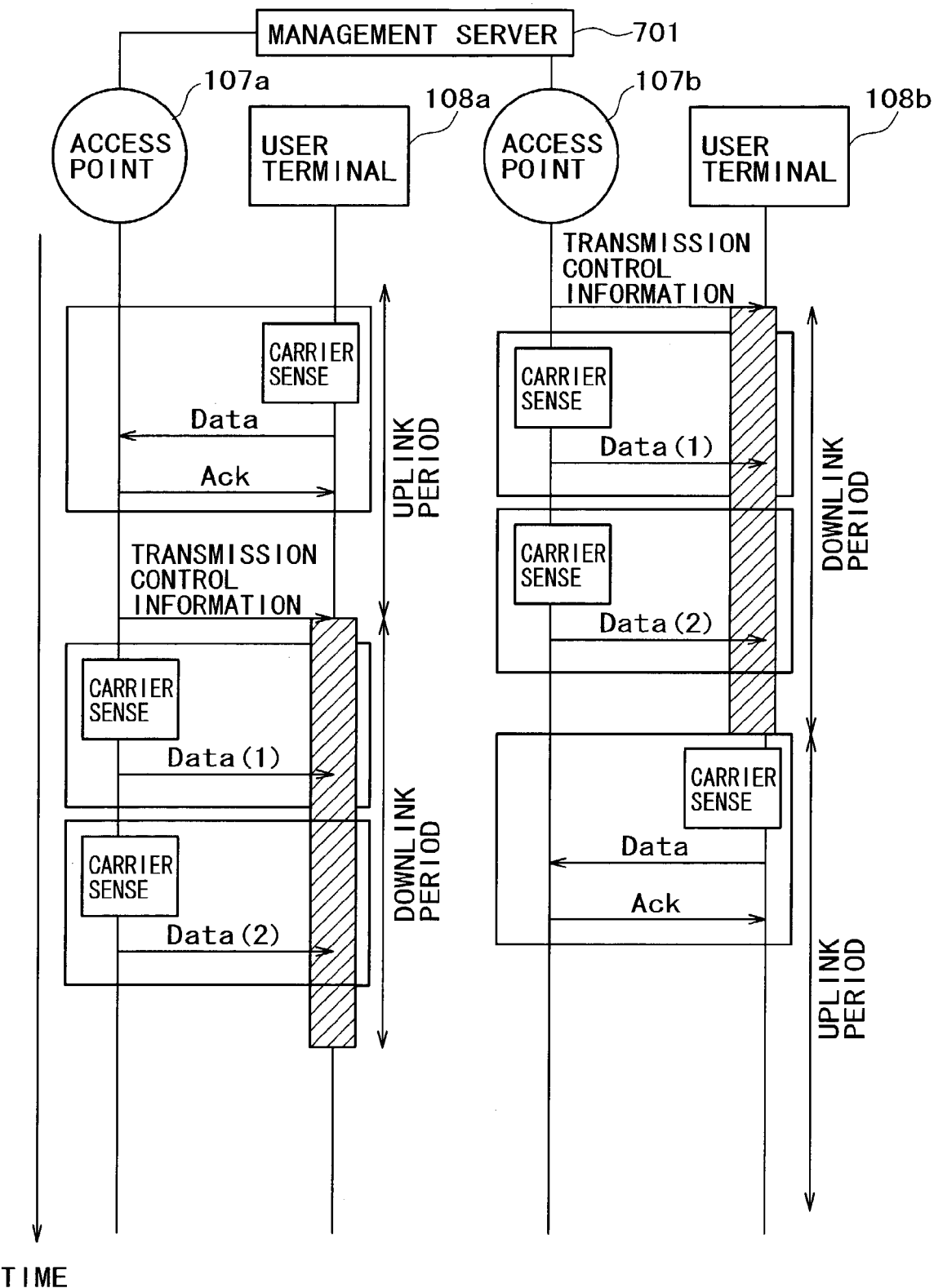
FIG. 19 is a schematic diagram that illustrates an example of discrete access point control, in accordance with the first and the second embodiments of the present invention.

FIG. 19 is a schematic diagram that illustrates an example of discrete access point control, in accordance with the first and the second embodiments of the present invention. The management server 701 calculates an optimum ratio of uplink period to downlink period. However, for one couple of the access point 107a and user terminal 108a and another couple of the access point 107b and user terminal 108b, the same ratio of uplink period to downlink period does not always apply. If, for example, the management server knows that certain conditions are satisfied so that data packets from/to the user terminal 108a do not cause collision with data packets to the user terminal 108b and there is no interference problem, the management server can control downlink periods and uplink periods independently. In this case, discrete control can be implemented as follows. The calculation part of control frame length and a ratio of uplink period 1602 shown in FIG. 16 or FIG. 18 calculates, for each individual access point, an optimum ratio of uplink period to downlink period so that as many data pockets as possible can be carried and so that the management server sends different transmission control information to each access point.

Figure 1:
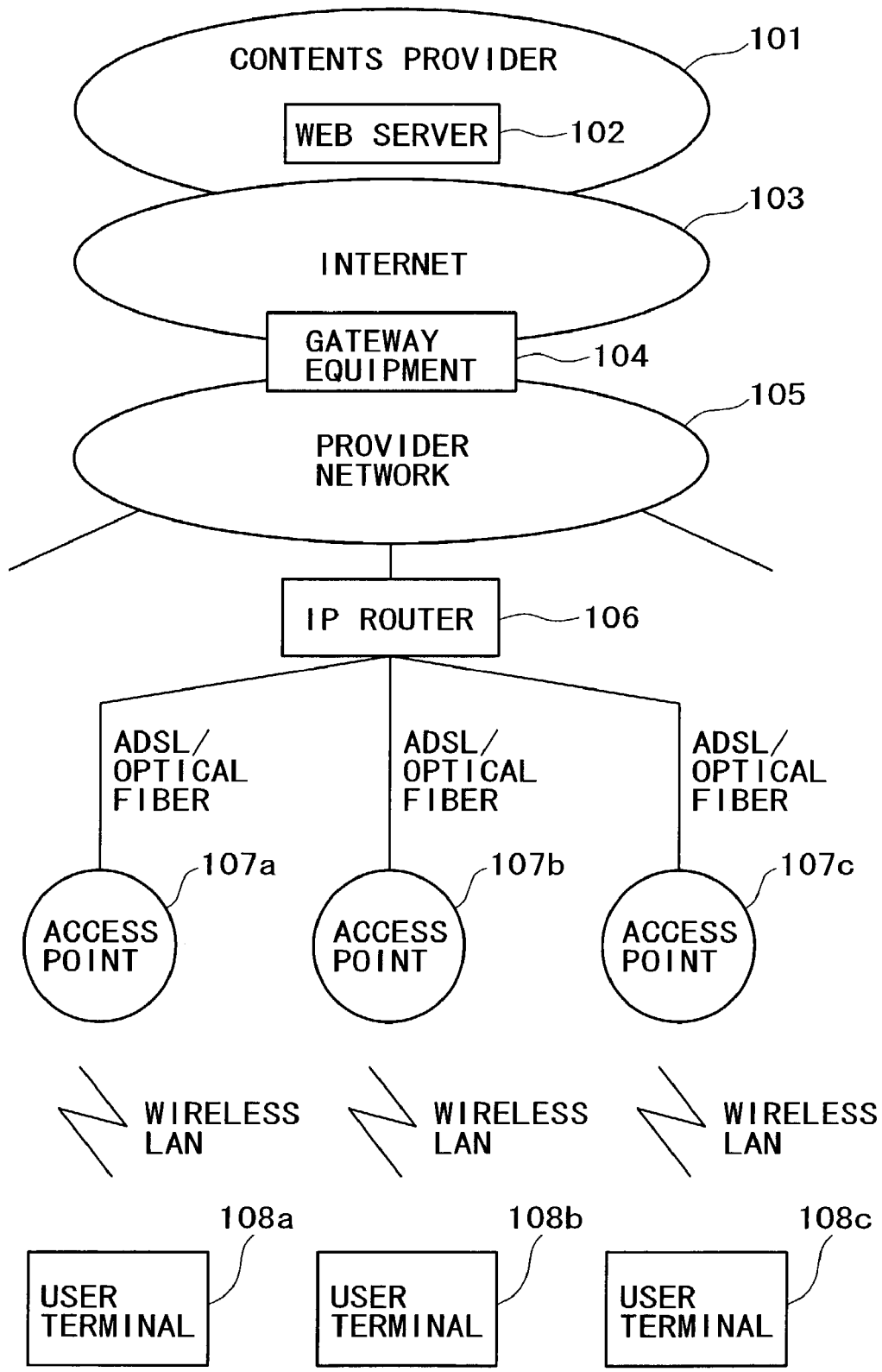
FIG. 1 shows a system configuration example of a wireless access system.
Figure 2:
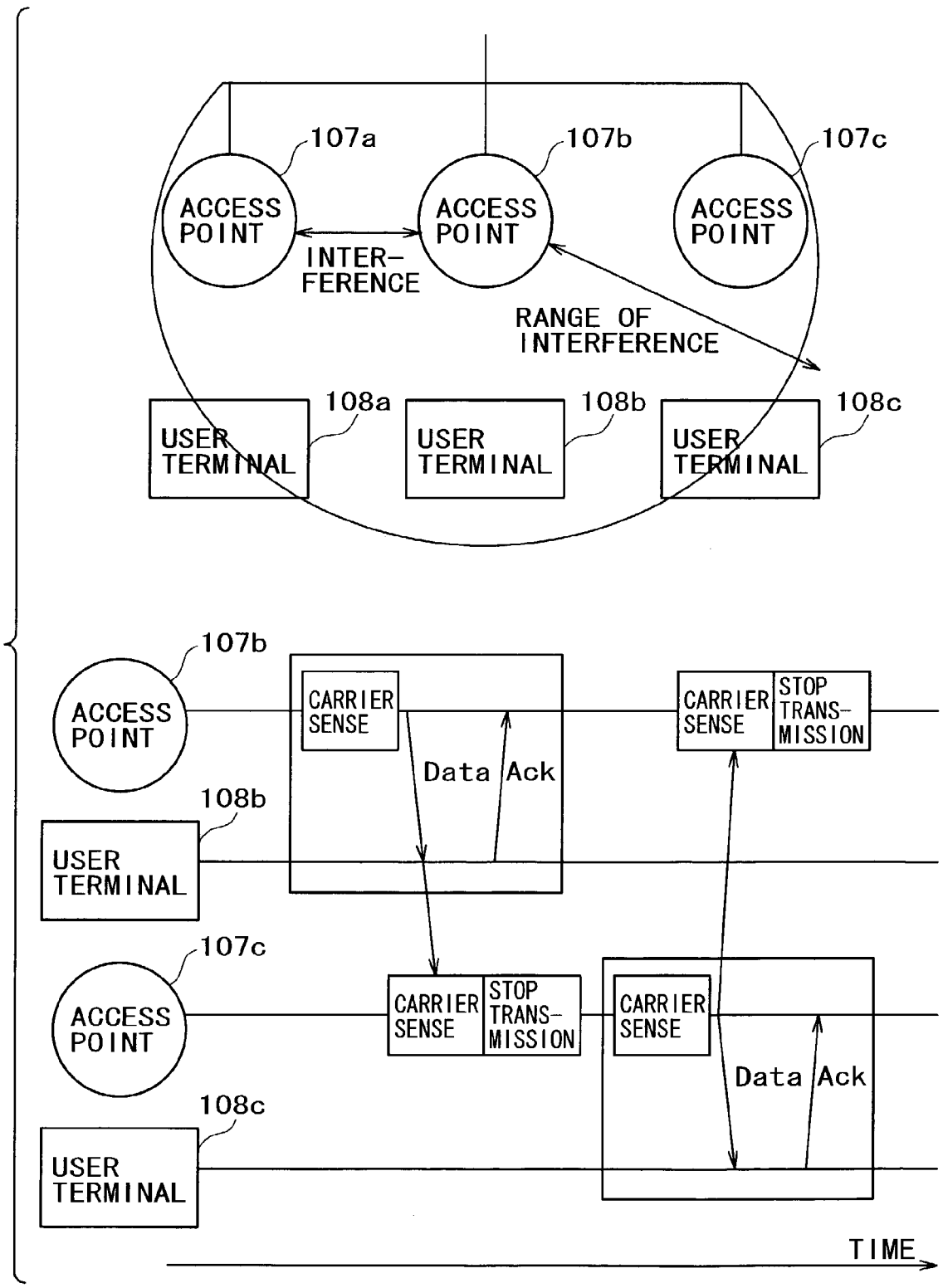
FIG. 2 is a schematic diagram that explains an access method addressing the interference problem between access points, specified in Media Access Control (MAC) sublayer specifications of the IEEE 802.11 standard for wireless LAN specifications.
Figure 3:
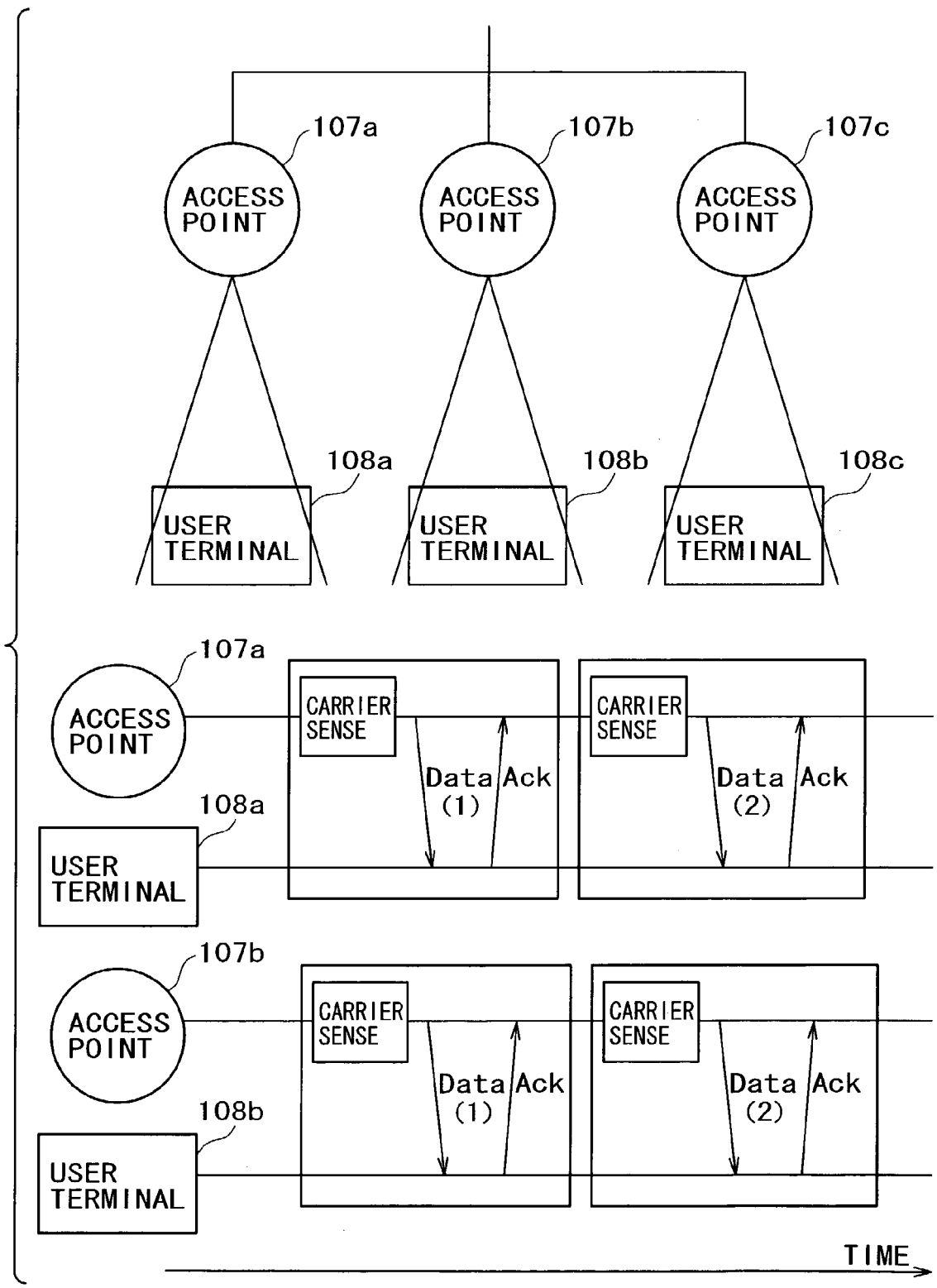
FIG. 3 is a schematic diagram that explains a method for enhancing throughput by parallel transmission from access points.
Figure 4:
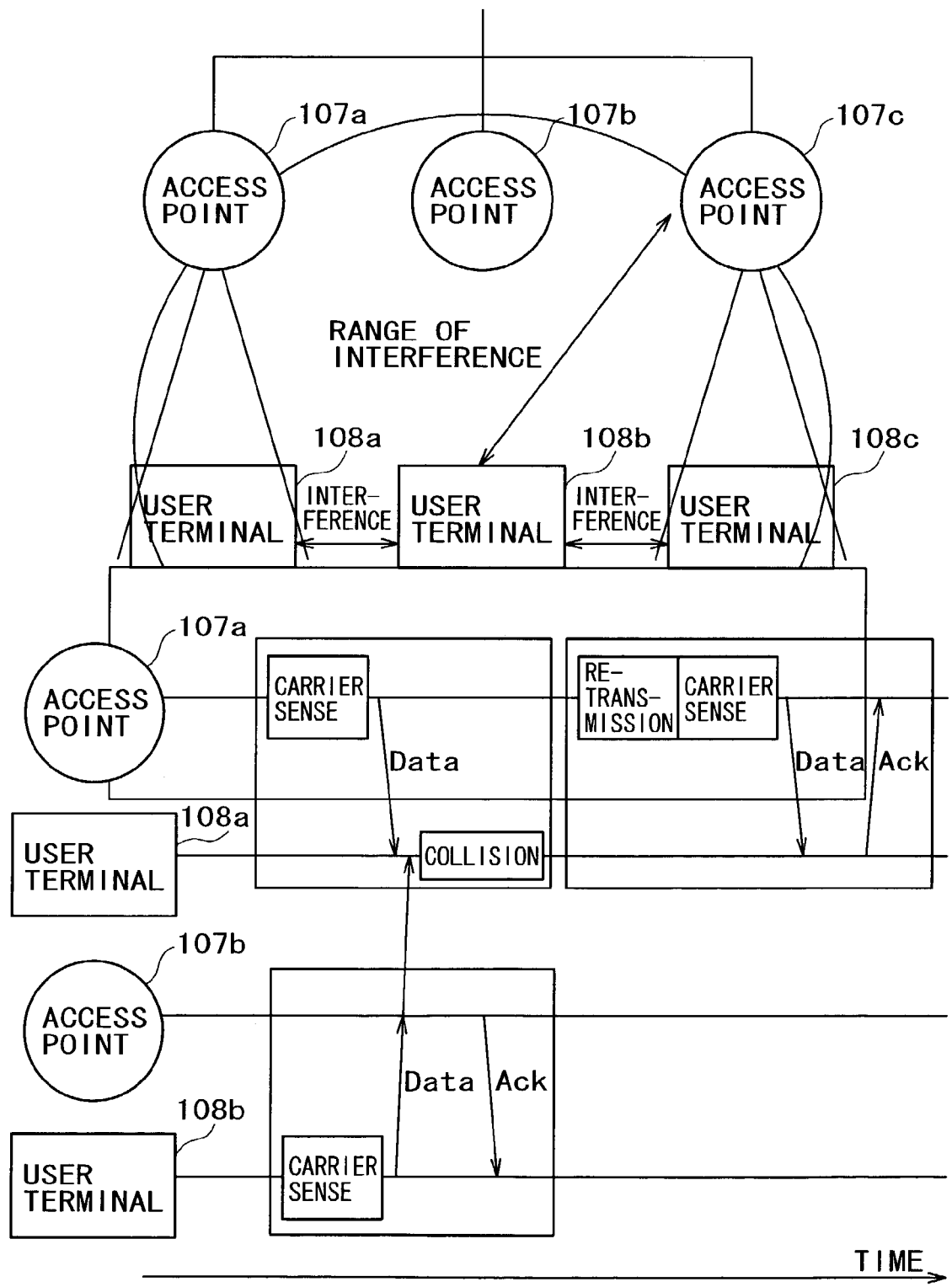
FIG. 4 is a schematic diagram that shows a problem associated with a wireless communication system where access points are equipped with a directional antenna and power control function, where user terminals are equipped with a non-directional antenna and without the power control function.
Figure 5:
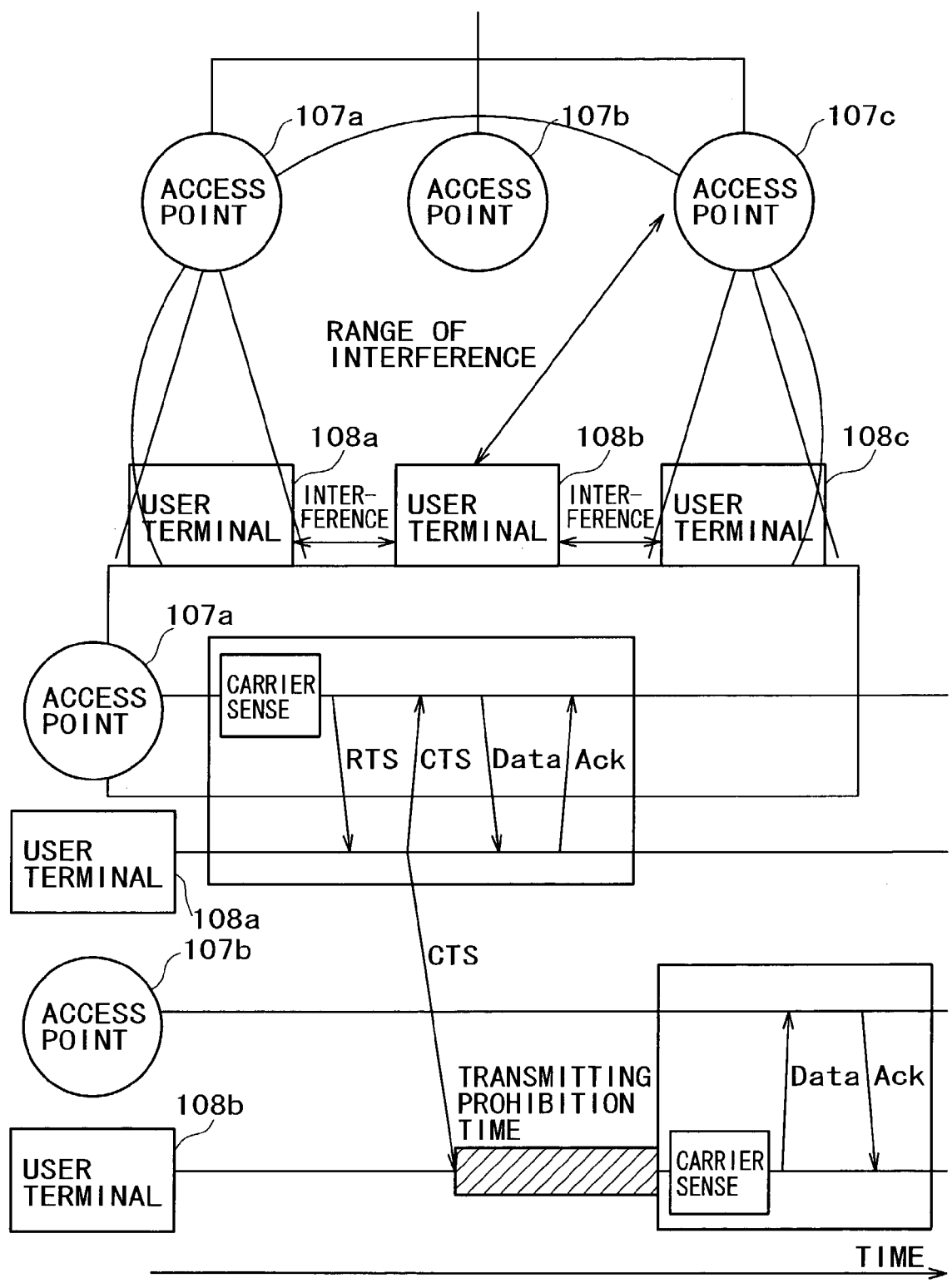
FIG. 5 is schematic diagram that shows the method for avoiding packet collision by virtual carrier sense.
Figure 6:
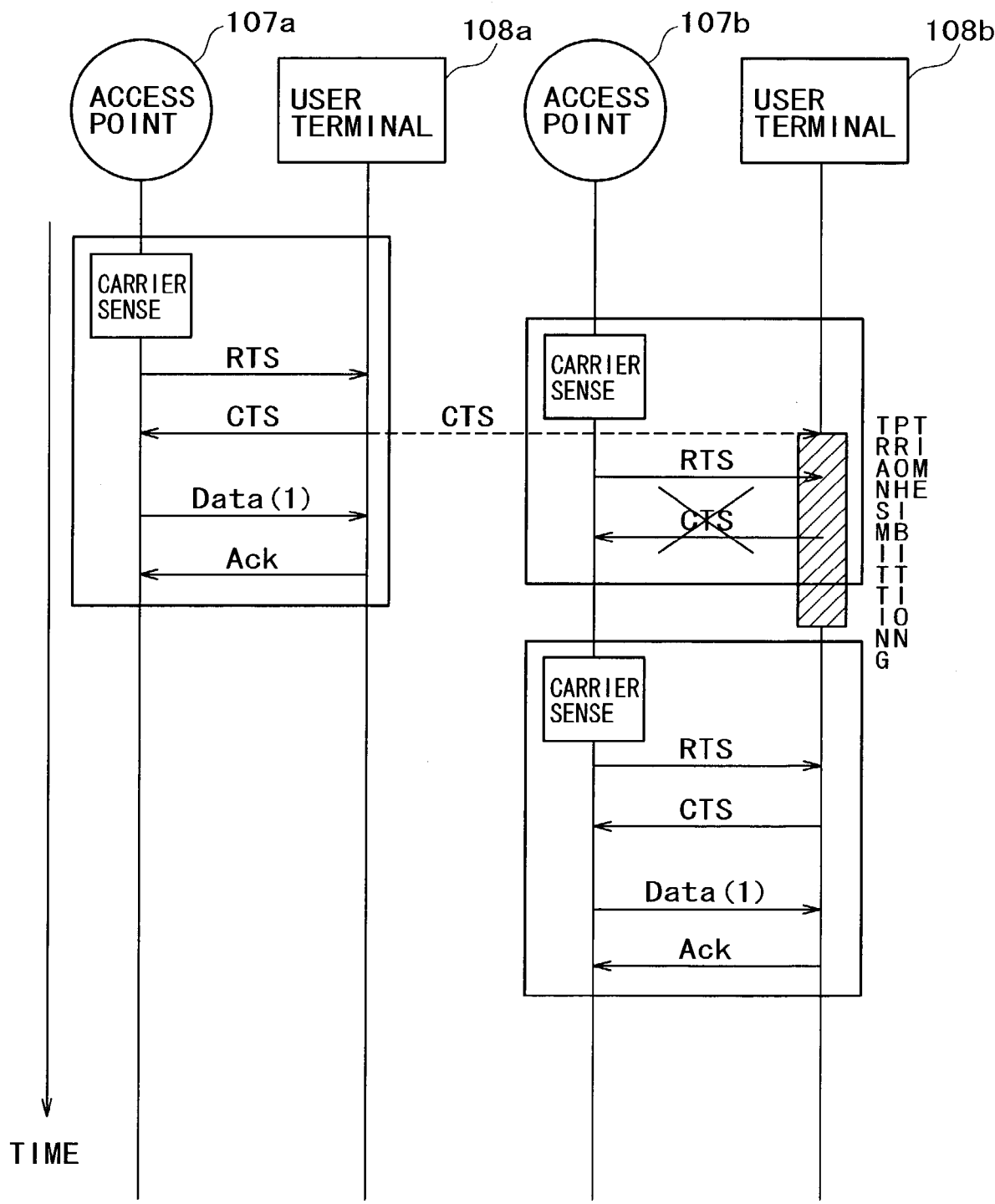
FIG. 6 is a schematic diagram that shows the reason why throughput does not increase even with virtual carrier sense.
Figure 21:
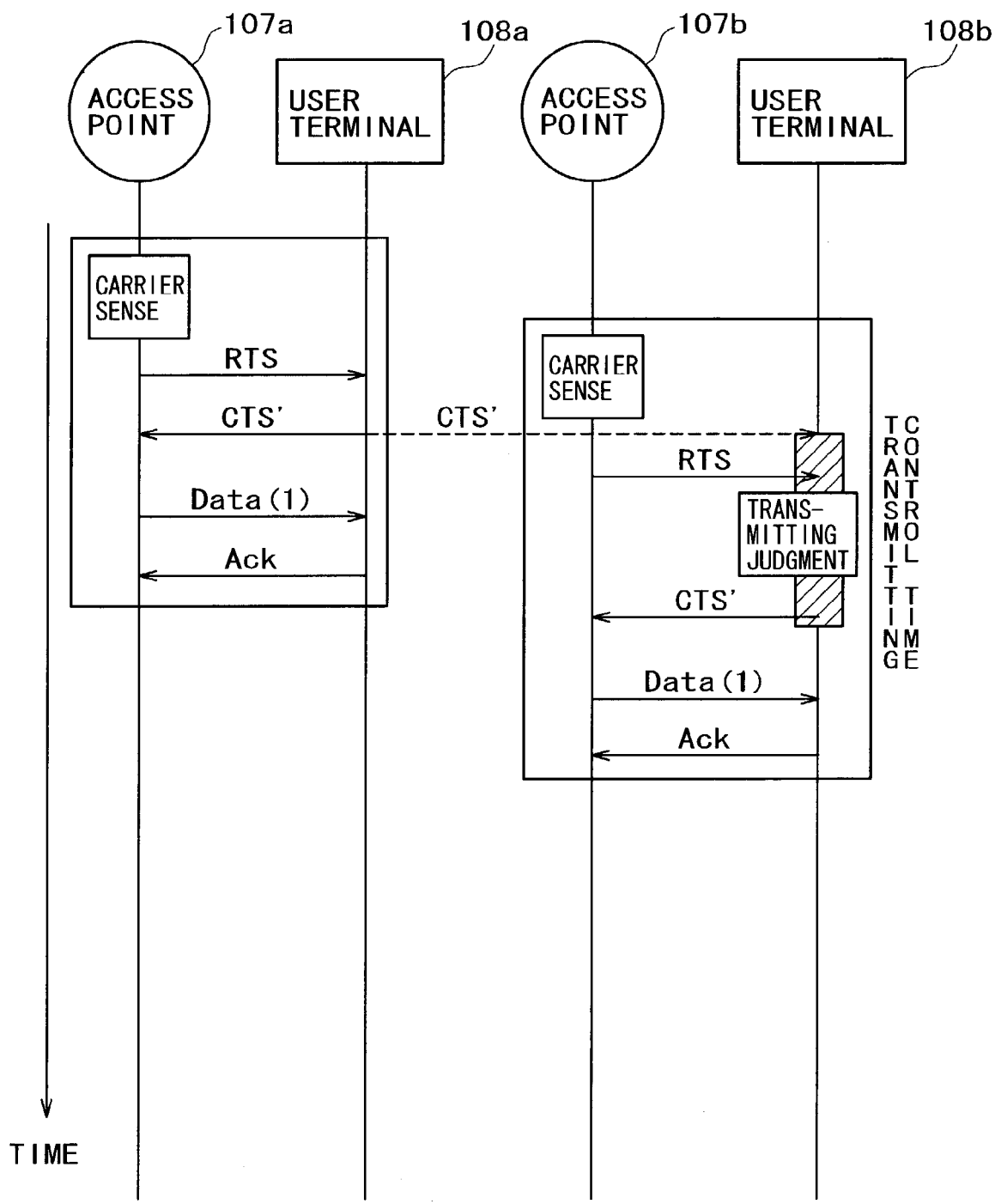
FIG. 21 is a schematic diagram that shows a decentralized traffic control method, in accordance with one embodiment of the present invention.

FIG. 21 is a schematic diagram that shows a decentralized traffic control method, in accordance with one embodiment of the present invention. In the system described with reference to FIG. 6, immediately before an access point 107a transmits data to a user terminal 108a, the system transmits an RTS control packet to reserve the communication channel, and transmission from its neighboring nodes is prohibited by a CTS control packet.

In the example of FIG. 21, however, transmission from a neighboring node is not prohibited by a CTS control packet, but restrained by a CTS' control packet. The CTS' control packet conveys power information required for judging whether transmission should be restrained and time information during which transmission should be restrained. When another user terminal 108b receives the CTS' control packet from the user terminal 108a, it can judge whether it interferes with the user terminal 108a from the power information. Even within time during which transmission should be restrained by the CTS' control packet, when the user terminal 108b receives an RTS control packet, that is, a request to send from its correspondent access point 107b, it can return a CTS' control packet to the access point 107b when it has judged that transmission causes no interference with the user terminal 108a and can receive data packets from the access point 107b. In this way, the user terminal 108b can communicate with the access point 107b concurrently with the ongoing communication between the access point 107a and user terminal 108a. Consequently, the transmit prohibition state, which is unnecessary, is eliminated and the system throughput can be enhanced.

Figure 22:
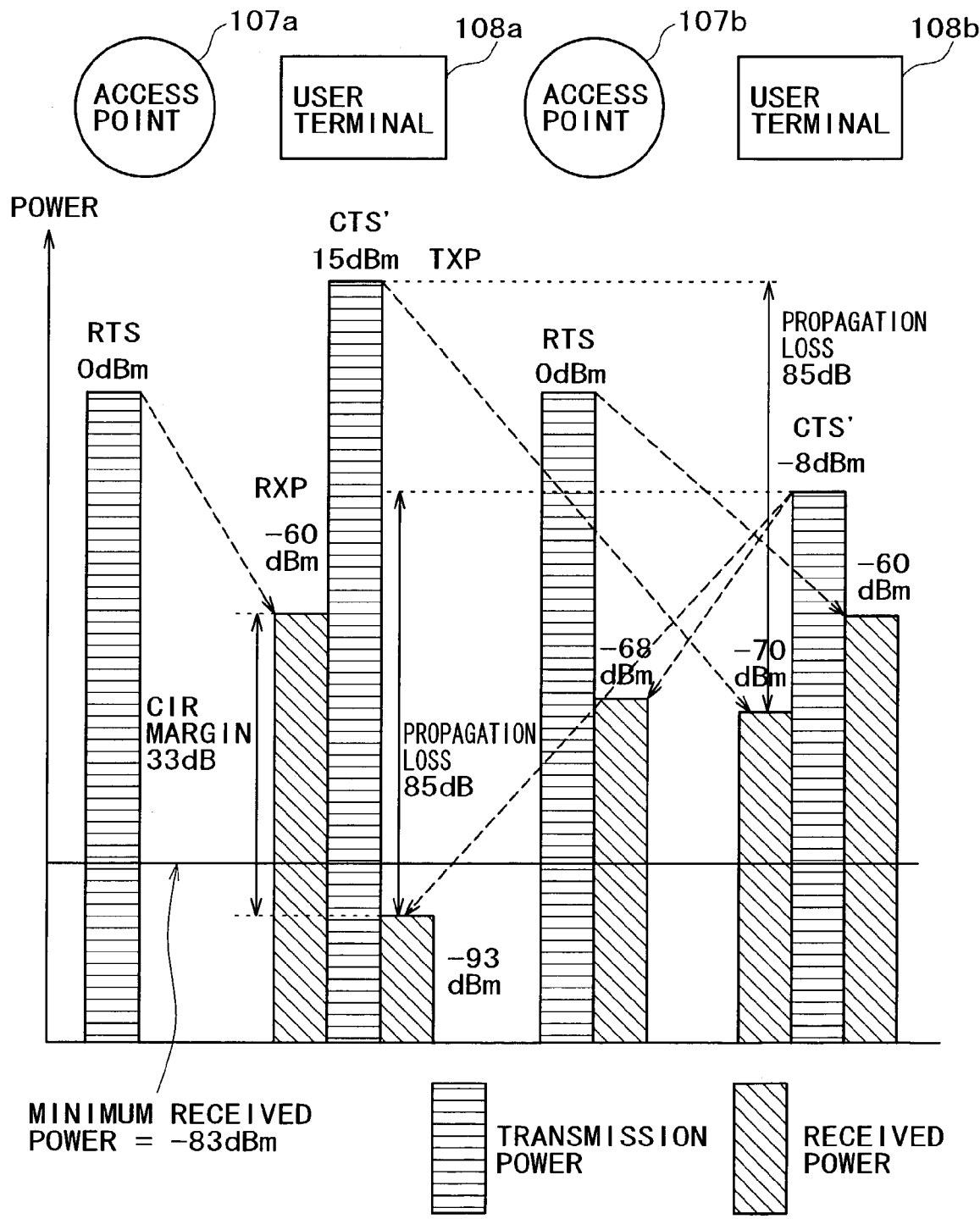
FIG. 22 is a graph for explaining the relationship between transmission power and received power for the access points and user terminals, accordance with the third embodiment of the present invention.

FIG. 22 is a graph for explaining the relationship between transmission power and received power for the access points and user terminals, accordance with the third embodiment of the present invention. Assume that an RTS control packet transmitted by the access point 107a with transmission power of 0 dBm was received by the user terminal 108b with received power of −60 dBm (RX). At this time, if the desired carrier to interference ratio (CIR) in the received power has a margin of 33 dB, no interference with its neighboring nodes shall occur. The user terminal 108a transmits a CTS' control packet with transmission power of 15 dBm (TX) to its neighboring nodes, wherein the packet includes the above-mentioned received power (RXP), desired carrier to interference ratio (CIR), and transmission power (TXP) as control information.

If, on the other hand, the user terminal 108b received the CTS' control packet with received power of −70 dBm, then it would detect a propagation loss of 85 dB from the difference between the received power and the transmission power (TXP) of the CTS' control packet. Upon having received an RTS control packet from the access point 107b, if the user terminal 108b transmits a CTS' control packet with transmission power of −8 dBm, the received power of the CTS' control packet at the user terminal 108a would be −93 dBm because it is believed that the packet arrives at the user terminal 108a with the propagation loss of 85 dB. Knowing that the received power of the CTS' control packet satisfies the margin of 33 dB of the desired CIR, the user terminal 108b can autonomously determine that it may transmit the CTS' control packet.

Figure 23:
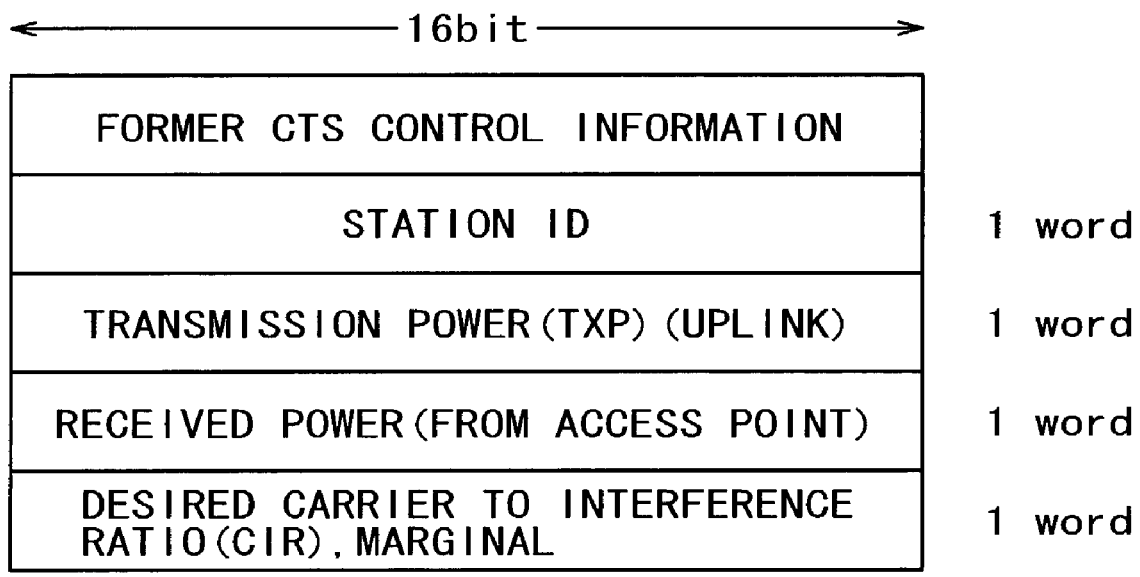
FIG. 23 illustrates a CTS' control packet format, in accordance with the third embodiment of the present invention.

FIG. 23 illustrates a CTS' control packet format, in accordance with the third embodiment of the present invention. In addition to former CTS control information (transmit prohibition time), this packet includes the following elements: station IO, transmission power (TXP) (uplink), received power (RXP) (from access point), and desired carrier to interference ratio (CIR).

Figure 24:
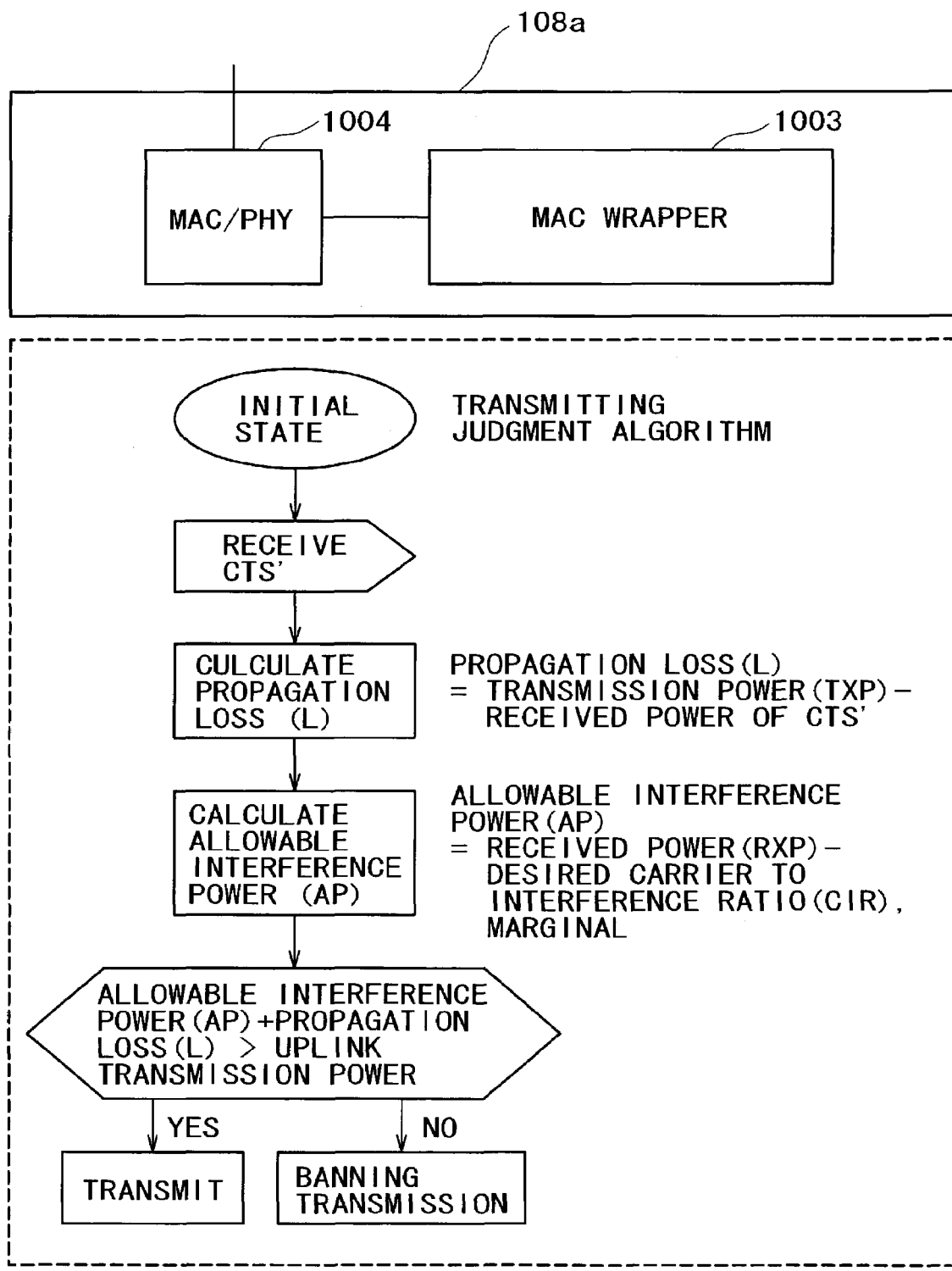
FIG. 24 is a schematic diagram of a transmitting judgment algorithm to be executed on a user terminal, in accordance with the third embodiment of the present invention.

FIG. 24 is a schematic diagram of a transmitting judgment algorithm to be executed on a user terminal, in accordance with the third embodiment of the present invention. On a user terminal that received a CTS' control packet, the MAC wrapper 1003 executes the transmitting judgment algorithm. When having received the CTS' control packet, the algorithm first calculates propagation loss L over the channel up to the user terminal that transmitted the CTS' control packet, using the following equation (3):

$$\text{Propagation loss } (L) = \text{transmission power } (TXP) - \text{CTS' received power} \quad (3)$$

Then, the algorithm calculates allowable interference power (AP) that is allowable for the user terminal that transmitted the CTS' control packet, using the following equation (4):

$$\text{Allowable interference power } (AP) = \text{received power } (RXP) - \text{desired carrier to interference ratio } (CIR) \quad (4)$$

If the transmission power (uplink transmission power) of the user terminal that received the CTS' control packet is greater than allowable interference power (AP) plus propagation loss (L), it will interfere with the user terminal that transmitted the CTS' control packet and transmission is banned. Conversely, if the transmission power of the user terminal that received the CTS' control packet can be set less than allowable interference power (AP) plus propagation loss (L), transmission is enabled without causing interference with the user terminal that transmitted the CTS' control packet.

According to the present invention, in a wireless communication system where access points are equipped with a directional antenna and power control function, and where user terminals are equipped with a non-directional antenna and without the power control function, concurrent transmission of data packets from a plurality of access points to a plurality of user terminals is enabled and the total system throughput can be enhanced.

Figure 20:
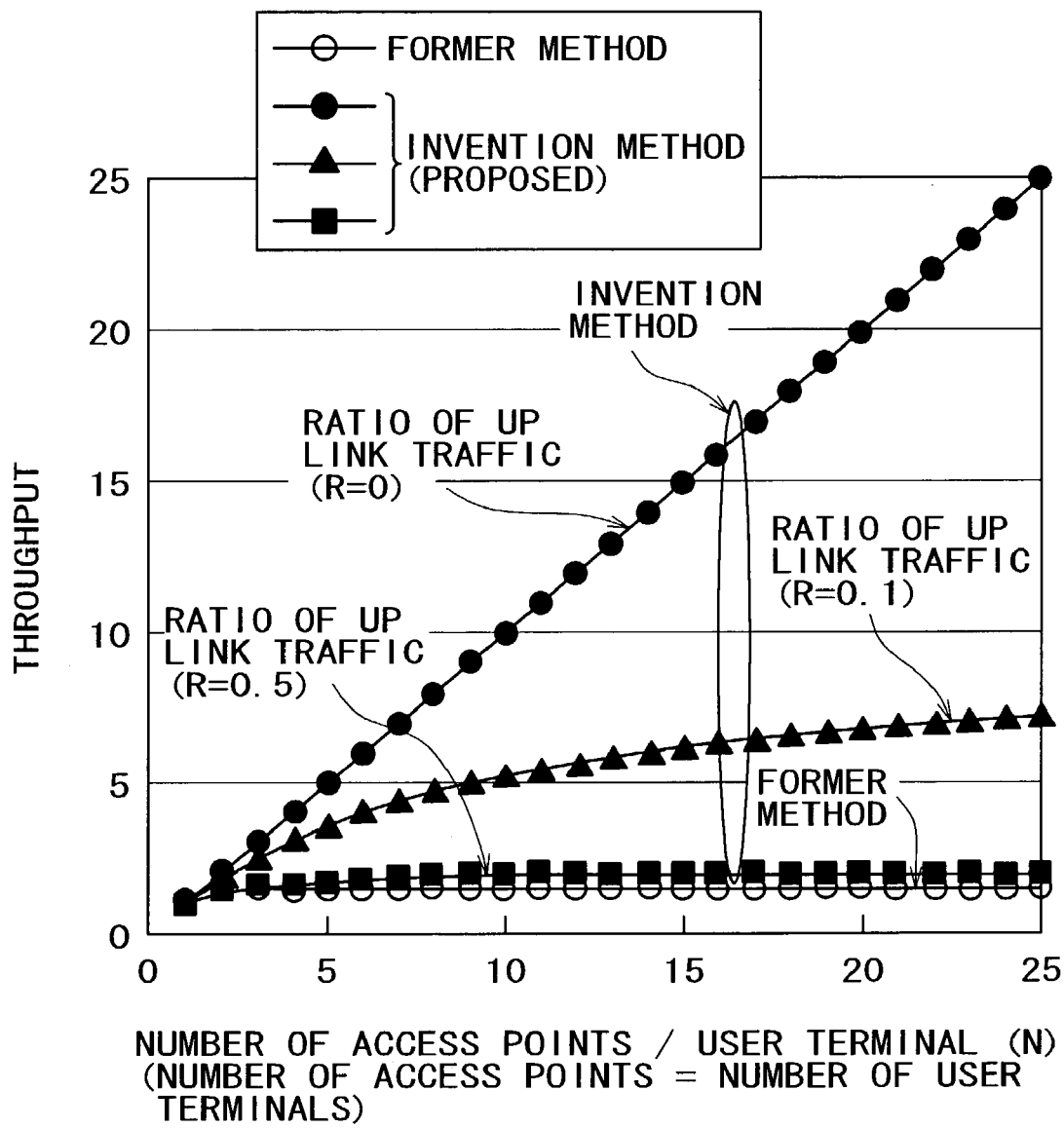
FIG. 20 is a graph for the effect of the traffic control of centralized management type, in accordance with the first and second embodiments of the present invention.

FIG. 20 is a graph for the effect of the traffic control of centralized management type, in accordance with the first and second embodiments of the present invention. If the number of access points is equal to the number of user terminals and if the proportion of uplink traffic in the total traffic (the ratio of uplink traffic to total traffic) is 0, the total system throughput is enhanced in proportion to increase in the number of the access points and user terminals. Downlink traffic is a considerably large proportion of traffic on the Internet, and the proportion of uplink traffic in Web browsing application is about 0.1. Therefore, an increase in the number of access points by applying the wireless communication method of the present invention enhances the total system throughput.

In a wireless communication system where access points are equipped with a directional antenna and power control function, and where user terminals are equipped with a non-directional antenna and power control function, by autonomously adjusting the transmission power of a user terminal to a power level that restrains interference with its neighboring user terminals, concurrent transmission of data packets from a plurality of access points to a plurality of user terminals is enabled and the total system throughput can be enhanced.

Figure 25:
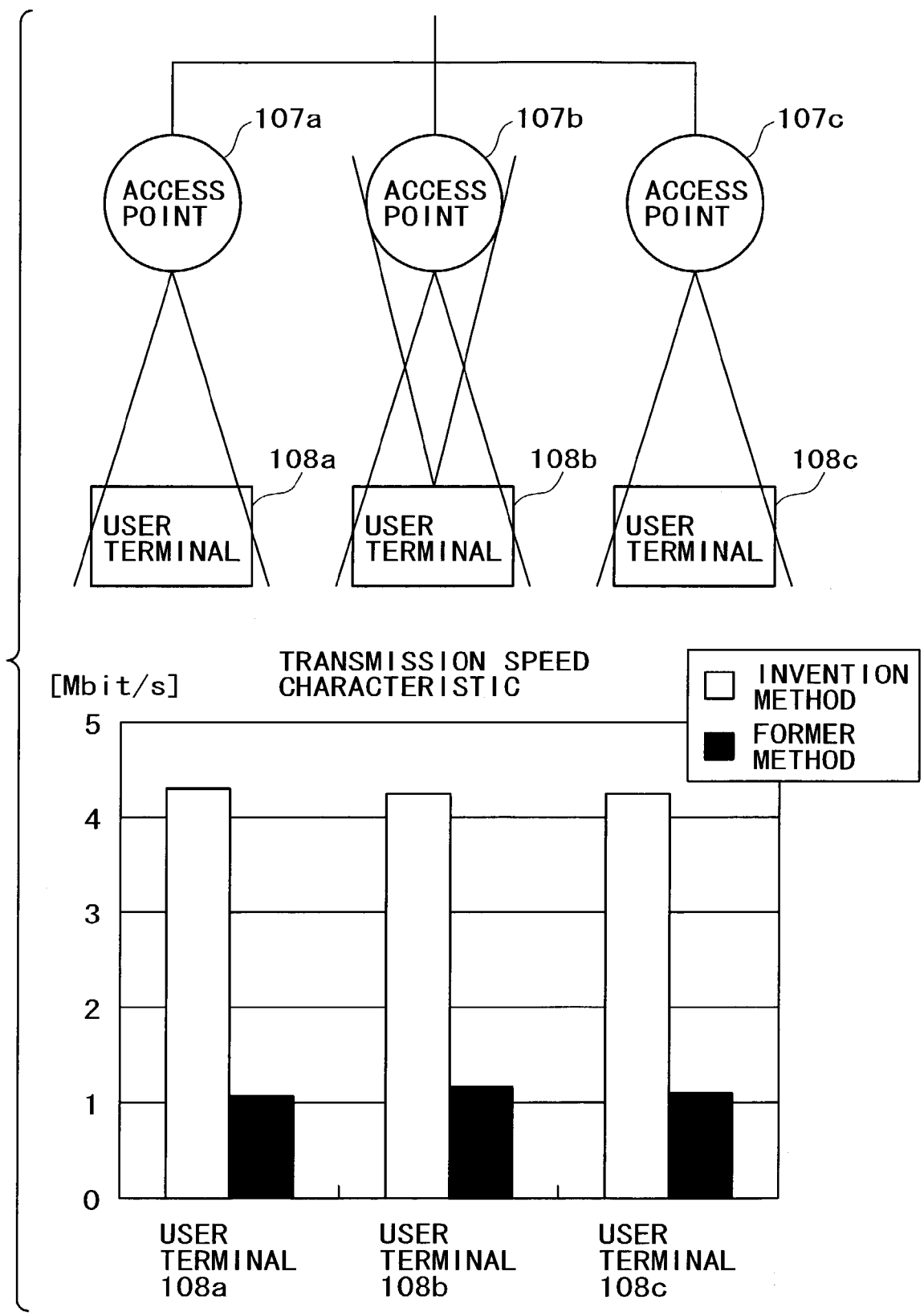
FIG. 25 is a graph showing the effect of the decentralized traffic control, in accordance with the third embodiment of the present invention.

FIG. 25 is a graph showing the effect of the decentralized traffic control, in accordance with the third embodiment of the present invention. In the present invention, the transmission power of the user terminals 108a, 108b, 108c is adjusted to prevent interference with other terminals. The graph exhibits high throughput.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, assigning a downlink period of transmission from an access point to a user terminal and an uplink period of transmission from the user terminal to the access point, allowing access points to perform concurrent transmission to correspondent user terminals and to halt other user terminals from transmitting data, and during the uplink period, allowing one user terminal to perform transmission at a time, according to processes of the present invention.

Other Embodiments of the Present Invention

The present invention includes, but is not limited to, the following additional embodiments.

The wireless access system may include user terminals and access points, where a user terminal connects to a wired network via an access point, and in a wireless communication system where the access points are equipped with a directional antenna which directs beams toward a user terminal and a transmit power control function, whereas the user terminals are equipped with a non-directional antenna which does not direct beams toward a certain direction and the transmit power control function, user terminal equipment which enables concurrent transmission from a plurality of access points to a plurality of user terminals in such a manner that, in a reply packet to a control packet for communication channel reservation from an access point to a user terminal, the user terminal includes information comprising transmission control time, transmission power of the user terminal, received power of the control packet from the access point, and desired carrier to interference ratio for the received power, and another user terminal that received the reply packet controls its transmission power at a level not to interfere with the user terminal that transmitted the reply packet.

The communication system may include a plurality of access points, where the access points are configured to restrict the arrival range of radio waves transmitted from the access points, the communication system is characterized in that access control is performed by properly assigning a downlink period of transmission from an access point to a user terminal and an uplink period of transmission from the user terminal to the access point; during the downlink period, the access control allows the plurality of access points to do concurrent transmission to correspondent user terminals and bans user terminals from transmitting at least of a part of data; during the uplink period, the access control allows one user terminal to do transmission at a time. Such a communication system may further include a management server communicable with the access points and the access control and allowing and banning transmission are performed, according to control information from the management server. The management server may transmit control signals to the user terminals via the access points.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A communication system comprising:
   one or more user terminals, each of the one or more user terminals having a non-directional antenna;
   one or more access points, each of the one or more access points having a directional antenna and a transmit power control function; and
   a management server,
   wherein the management server is configured to control transmission between the one or more access points and the one or more user terminals using control information based on a transmission queue for measuring downlink traffic and a receiving queue for measuring uplink traffic,
   wherein during a downlink period, control by the management server allows the one or more access points to do concurrent transmission to corresponding ones of the one or more user terminals and prevents the one or more user terminals from transmitting at least of part of data to be transmitted therefrom, and during an uplink period, control by the management server allows one user terminal at a time to transmit, and
   wherein uplink transmit/receive power and downlink transmit/receive are asymmetric.

2. The communication system of claim 1, wherein each of the one or more access points is configured to transmit and receive wireless signals, and further comprises one of:
   a wireless interface configured to perform wireless signal processing;
   a wired interface configured to perform wired signal processing, the transmit queue being configured to store data packets from the wired interface to the wireless interface;
   a measurement device configured to measure variable transmit queue lengths;
   a control signal processing device configured to create control signals for notifying the management server of measurement results from the transmit queue measurement device and further configured to receive control signals about time of data packet transmission/reception consisting of the downlink period and the uplink period from the management server;
   a transmit timing control device configured to control timing of writing from the transmit queue to the wireless interface;
   a timer configured to provide time information for managing transmit and receive timing;
   a synchronous pilot signal generator configured to generate synchronous pilot signals for synchronizing another access point with time information from the timer;
   a transmission device configured to transmit the synchronous pilot signals through either the wireless interface or the wired interface; and
   a synchronous pilot signal detector configured to detect synchronous pilot signals received through the wireless interface or the wired interface and further configured to rectify timer information from the timer.

3. The communication system of claim 2, wherein in order that a data packet transmitted from a first access point and received by a first user terminal does not collide with a reply packet transmitted from a second user terminal to a data packet transmitted from a second neighboring access point, MAC wrappers are installed in each access point and each user terminal and the access point transmits a broadcast packet into which its MAC wrapper maps a header including destination information and data so that reply packet transmission from a user terminal does not take place during a downlink period, and on the user terminal, a MAC wrapper detaches the header from the received broadcast packet and a reply packet is transmitted from the user terminal to the access point during an uplink period.

4. The communication system of claim 1, wherein each of the one or more user terminals is configured to transmit and receive wireless signals, and further comprises:
a wireless interface configured to perform wireless signal processing;
an external interface configured to perform signal processing for interfacing with an external device, the receive queue being configured to store data packets received from the wireless interface to the external interface, and the transmit queue being configured to store data packets transmitted from the external interface to the wireless interface;
a control signal processing device configured to receive control signals about time of data packet transmission from the one or more access points;
a transmit and receive timing control device configured to control timing of writing from the transmit queue to the wireless interface and further configured to control timing of writing from the receive queue to the external interface, based on information from the control signal processing part;
a timer configured to provide time information for managing transmit and receive timing; and
a synchronous pilot signal detector configured to get synchronous pilot signals for synchronizing the one or more access points with time information from the timer through the wireless interface and further configured to rectify time information from the timer.

5. The communication system of claim 1, wherein at least one of the one or more access points further comprises:
a calculation device configured to calculate a control frame length, the control frame being a period in which time of data packet transmission between an access point and a user terminal is controlled, and further configured to calculate a ratio of uplink traffic, based on the one or more access point transmit and receive queue length data.

6. The communication system of claim 1, wherein the management server comprises:
a wired interface configured to perform wired signal processing;
transmit queues configured to store data packets from the management server to the one or more access points;
receive queues configured to store data packets from the one or more access points via the management server to a wired network;
a measurement device configured to measure variable transmit and receive queue lengths;
a database configured to register measured transmit and receive queue lengths;
a calculation device configured to calculate control frame length in which time of data packet transmission between an access point and a user terminal is controlled and further configured to calculate a ratio of uplink period, based on the transmit and receive queue length data.

7. A communication system according to claim 1, wherein if an Ack transmission during a downlink period is permitted, a transmission timing of Ack packets sent from the user terminals are synchronized.

8. A communication system according to claim 1, wherein if an Ack transmission during a downlink period is not permitted, the Ack packets are allowed to transmit during the uplink.

9. A communication system according to claim 1, wherein the access point has a measurement part of the transmission queue and the receive queue.

10. A communication system according to claim 1, wherein the management server has a measurement part of the transmission queue and the receive queue.

11. A method of controlling access of a communication system including one or more user terminals, one or more access points and a management server, wherein the one or more access points are each configured with a directional antenna and a transmit power function to enable transmission to a target user terminal without interference with other access points or user terminals, and wherein the user terminals are each configured with a non-directional antenna to enable data transmission without interference with other access points or user terminals, the method comprising:
assigning a downlink period of transmission from an access point to a user terminal and an uplink period of transmission from the user terminal to the access point;
allowing access points to perform concurrent transmission to correspondent user terminals and to halt user terminals from transmitting at least a part of data to be transmitted therefrom; and
during the uplink period, allowing one user terminal at a time to perform data transmission.

12. The method of claim 11, wherein the method further comprises exerting control to halt the transmission of a user terminal falling within a predetermined range of interference with a destination user terminal.

13. The method of claim 11, further comprising:
exerting control of the user terminals via the access points; and
under command of the management server, sending transmission control information to a user terminal to halt transmission by the user terminal for a suitable time period.

14. The method of claim 13, further comprising:
allowing the one or more access points to transmit concurrently to correspondent user terminals;
halting user terminals from transmitting reply packets and data during the downlink period; and
transmitting reply packets during the uplink period.

15. The method of claim 13, further comprising:
allowing the one or more access points to transmit concurrently to correspondent user terminals;
halting the user terminals from transmitting data;
allowing the user terminals to transmit Ack packets during the downlink period; and
synchronizing reply packet transmissions from the user terminals.

16. The method of claim 13, further comprising:
storing data packets to transmit in transmit queues of the one or more access points;
storing received data packets in receive queues of the one or more access points;
reporting the states of the transmit and receive queues to the management server;
calculating a downlink period from the transmit queue state;
calculating an uplink period from the receive queue state;
calculating a control frame length;
calculating a ratio of the uplink period in the control frame length;
creating control signals based on results of the downlink period, the uplink period, the control frame length, and the ratio of the uplink period; and sending the control signals to the one or more access points.

17. The method of claim 16, wherein the states of the transmit queues and the receive queues are the lengths of the queues.

18. A computer-readable medium implementing a method for controlling a distributed storage system for controlling access of a communication system including one or more user terminals, one or more access points and a management server, wherein the one or more access points are each configured with a directional antenna and a transmit power function to enable transmission to a target user terminal without interference with other access points or user terminals, and wherein the user terminals are each configured with a non-directional antenna to enable data transmission without interference with other access points or user terminals, to perform the steps of:

assigning a downlink period of transmission from an access point to a user terminal and an uplink period of transmission from the user terminal to the access point;

allowing access points to perform concurrent transmission to correspondent user terminals and to prevent user terminals from transmitting at least a part of data to be transmitted therefrom; and during the uplink period, allowing one user terminal at a time to perform data transmission.

19. The computer-readable medium of claim 18, wherein when the access points perform transmission to the user terminals, the management server is configured to exert control to halt the transmission of a user terminal falling within a predetermined range of interference with a destination user terminal.

* * * * *